US012762736B2

(12) United States Patent
Aizawa

(10) Patent No.: US 12,762,736 B2
(45) Date of Patent: Oct. 13, 2026

(54) PERIPHERAL MONITORING SYSTEM FOR WORK MACHINE, INFORMATION PROCESSING DEVICE, AND PERIPHERAL MONITORING METHOD

(71) Applicant: SUMITOMO HEAVY INDUSTRIES, LTD., Tokyo (JP)

(72) Inventor: Susumu Aizawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 252 days.

(21) Appl. No.: 18/634,085

(22) Filed: Apr. 12, 2024

(65) Prior Publication Data

US 2024/0265573 A1 Aug. 8, 2024

Related U.S. Application Data

(63) Continuation of application No. PCT/JP2022/037483, filed on Oct. 6, 2022.

(30) Foreign Application Priority Data

Oct. 15, 2021 (JP) ................................ 2021-169779

(51) Int. Cl.
*G06T 7/73* (2017.01)
*E02F 9/26* (2006.01)

(52) U.S. Cl.
CPC ................ *G06T 7/74* (2017.01); *E02F 9/261* (2013.01); *E02F 9/264* (2013.01); *G06T 2207/10028* (2013.01); *G06T 2207/30244* (2013.01); *G06T 2207/30252* (2013.01)

(58) Field of Classification Search
CPC ............ G06T 7/74; G06T 2207/10028; G06T 2207/30244; G06T 2207/30252; E02F 9/261; E02F 9/264; E02F 9/20; E02F 9/24; E02F 9/25; B66C 13/00
See application file for complete search history.

(56) References Cited

U.S. PATENT DOCUMENTS 9,944,499 B2 * 4/2018 Schoonmaker ......... B66C 13/18
12,252,870 B2 * 3/2025 Petrany ................ E02F 9/2883
2014/0270380 A1 9/2014 Morin
(Continued)

FOREIGN PATENT DOCUMENTS

CN 105209694 12/2015
JP 2001-055762 2/2001
(Continued)

OTHER PUBLICATIONS

International Search Report for PCT/JP2022/037483 mailed on Dec. 20, 2022.

*Primary Examiner* — Russell Frejd
(74) *Attorney, Agent, or Firm* — IPUSA, PLLC

(57) ABSTRACT

A peripheral monitoring system for a work machine includes a three-dimensional detector and processing circuitry. The three-dimensional detector is mounted on the work machine such that a part of the work machine is included in the measurement range of the three-dimensional detector. The processing circuitry is configured to acquire information detected by the three-dimensional detector and to specify the position or pose of the three-dimensional detector based on at least the shape of the part of the work machine included in the acquired detected information.

13 Claims, 19 Drawing Sheets

(56) References Cited

U.S. PATENT DOCUMENTS

| | | | | |
|---|---|---|---|---|
| 2016/0005234 | A1* | 1/2016 | Boivin | H04N 13/156 345/419 |
| 2016/0097183 | A1* | 4/2016 | Kirsch | E02F 3/764 701/50 |
| 2017/0094154 | A1 | 3/2017 | Kawamoto et al. | |
| 2019/0360176 | A1 | 11/2019 | Shimoda et al. | |
| 2021/0246625 | A1* | 8/2021 | Oi | E02F 9/265 |
| 2021/0263521 | A1* | 8/2021 | Kameyama | G05D 1/617 |

FOREIGN PATENT DOCUMENTS

| | | |
|---|---|---|
| JP | 2012-096915 | 5/2012 |
| JP | 2018-017617 | 2/2018 |
| JP | 2018-184815 | 11/2018 |
| WO | 2016/047808 | 3/2016 |

* cited by examiner

PERIPHERAL MONITORING SYSTEM FOR WORK MACHINE, INFORMATION PROCESSING DEVICE, AND PERIPHERAL MONITORING METHOD

CROSS-REFERENCE TO RELATED APPLICATIONS

This application is a continuation application filed under 35 U.S.C. 111 (a) claiming benefit under 35 U.S.C. 120 and 365 (c) of PCT International Application No. PCT/JP2022/037483, filed on Oct. 6, 2022 and designating the U.S., which claims priority to Japanese Patent Application No. 2021-169779, filed on Oct. 15, 2021. The entire contents of the foregoing applications are incorporated herein by reference.

BACKGROUND

Technical Field

The present disclosure relates to a peripheral monitoring system for a work machine, an information processing device, and a peripheral monitoring method.

Description of Related Art

In recent years, a space recognition device (for example, LiDAR) is often provided in a work machine in order to monitor the periphery of the work machine. The space recognition device provided in the work machine detects the periphery of the work machine. When a worker who operates the work machine performs work, safety can be improved by ascertaining a detection result of the space recognition device.

There is also a technique for combining detection results of multiple space recognition devices to display a result as combined information representing the periphery of a work machine to which the space recognition devices are provided. In order to generate such combined information, it is necessary to recognize the positions and the poses of the space recognition devices. Therefore, in a case where the space recognition devices are provided in a work machine, although it is necessary to set the position and the pose of each space recognition device, the load of setting processing is often heavy.

For example, in a crane as described in Japanese Unexamined Patent Publication No. 2012-096915, a number of counterweights is changed for each site. In a case where the space recognition device is provided on the upper surface of the counterweight of such a crane, the position and the pose of the space recognition device are required to be set according to the site.

SUMMARY

According to an aspect, a peripheral monitoring system for a work machine includes a three-dimensional detector and processing circuitry. The three-dimensional detector is mounted on the work machine such that a part of the work machine is included in the measurement range of the three-dimensional detector. The processing circuitry is configured to acquire information detected by the three-dimensional detector and to specify the position or pose of the three-dimensional detector based on at least the shape of the part of the work machine included in the acquired detected information.

EMBODIMENT OF THE INVENTION

Figure 1:
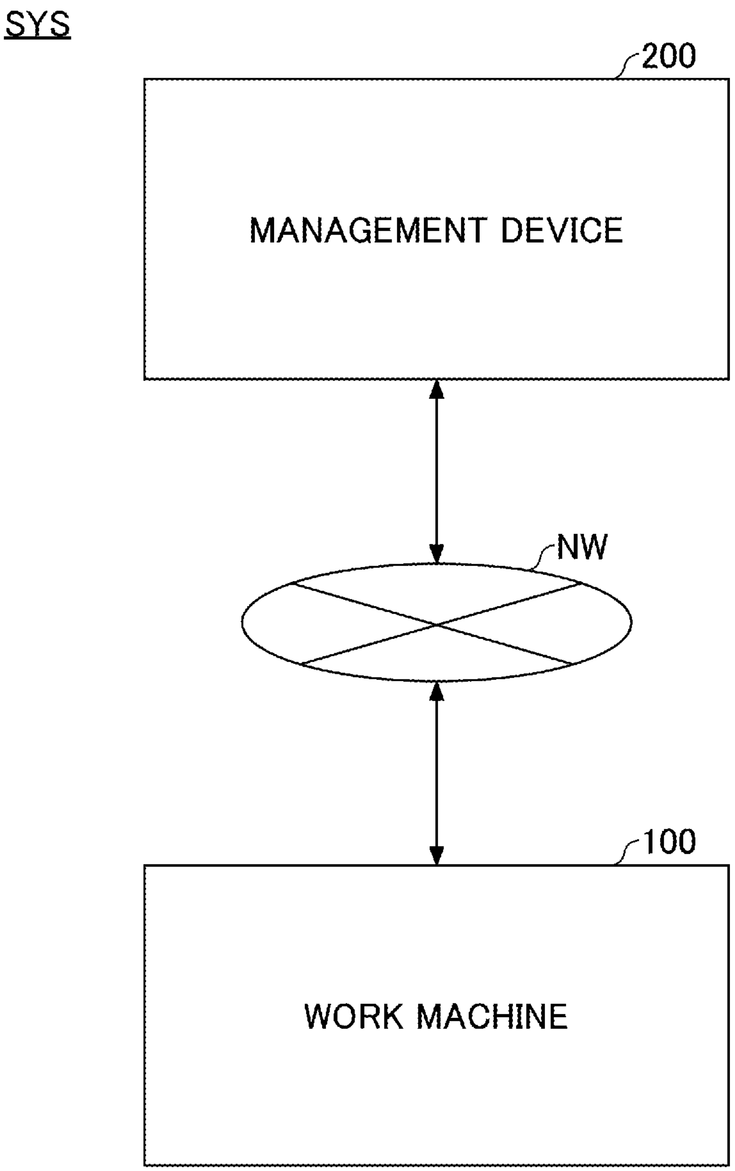
FIG. 1 is a schematic diagram illustrating an example of a peripheral monitoring system according to an embodiment.

In the related art, calibration for ascertaining at least one of the position or the pose of the space recognition device puts a heavy load on an operator who performs the setting processing.

According to an aspect of the present disclosure, a technique for reducing a load on an operator in order to specify a position or a pose of a space recognition device provided in a work machine is provided.

According to one aspect of the present disclosure, a load on the operator can be reduced.

Hereinafter, an embodiment of the present disclosure will be described with reference to the drawings. The embodiment described below is not intended to limit the invention but is merely of examples thereof, and all features and combinations thereof described in the embodiment are not necessarily essential to the invention. In the drawings, the same or corresponding components are denoted by the same or corresponding reference numerals, and the description thereof may be omitted.

[Overview of Peripheral Monitoring System]

An overview of a peripheral monitoring system SYS according to this embodiment will be described with reference to FIG. 1 to FIG. 3.

FIG. 1 is a schematic diagram illustrating an example of the peripheral monitoring system SYS according to this embodiment. FIG. 2, FIG. 3, and FIG. 4 are diagrams illustrating specific examples of a work machine 100 included in the peripheral monitoring system SYS. Specifically, FIG. 2 is a side view illustrating an example of a shovel 100A, and FIG. 3 is a top view illustrating the example of the shovel. FIG. 4 is a side view illustrating an example of a crawler crane 100B. Hereinafter, corresponding components (for example, components having the same function) of the shovel 100A and the crawler crane 100B are denoted by the same reference numerals and will be described.

As illustrated in FIG. 1, the peripheral monitoring system SYS includes the work machine 100 and a management device 200.

The peripheral monitoring system SYS may include one or more of the work machines 100. In a case where the work machines 100 are included in the peripheral monitoring system SYS, all of the work machines 100 may be of the same type, or at least some of the work machines may be of different types. For example, the peripheral monitoring system SYS may include the shovels 100A or the crawler cranes 100B described below, or may include one or more of the shovels 100A and one or more of the crawler cranes 100B.

The peripheral monitoring system SYS may include the management devices 200. That is, the management devices 200 may perform processing related to the peripheral monitoring system SYS in a distributed manner. For example, each of the management devices 200 may mutually communicate with some of the work machines 100 being managed among all the work machines 100 included in the peripheral monitoring system SYS to execute processing for the work machines 100 being managed among all the work machines 100.

For example, in the peripheral monitoring system SYS, the management device 200 collects information from the work machine 100 to monitor various states of the work machine 100 (for example, presence or absence of abnormality of various devices mounted on the work machine 100).

In the peripheral monitoring system SYS, for example, the management device 200 also monitors the periphery of the work machine 100 with a space recognition device 40 (an example of a three-dimensional detector) mounted on the work machine 100.

Furthermore, in the peripheral monitoring system SYS, the management device 200 may support remote operation of the work machine 100, for example.

In a case where the work machine 100 works fully automatically, in the peripheral monitoring system SYS, the management device 200 may support remote monitoring of the work of the work machine 100 that is operated fully automatically, for example.

<Overview of Work Machine>

The work machine 100 includes a lower traveling body 1, an upper swing body 3 swingably mounted on the lower traveling body 1 via a swing mechanism 2, an attachment AT attached to the upper swing body 3, a hook HK provided at the distal end of the attachment AT, and a cabin 10 in which an operator rides. Hereinafter, the front of the work machine 100 (upper swing body 3) corresponds to a direction in which the attachment to the upper swing body 3 extends when the shovel 100A is viewed in a plan view (top view) from right above along the rotation axis of the upper swing body 3. The left side and the right side of the work machine 100 (upper swing body 3) respectively correspond to the left side and the right side viewed from an operator seated on an operator's seat in the cabin 10.

As will be described below, the cabin 10 may be omitted when the work machine 100 is remotely operated or when the work machine 100 is operated fully automatically.

The work machine 100 can perform crane work (lifting work) for suspending a suspended load on the hook HK and causing at least one of the lower traveling body 1, the upper swing body 3, or the attachment AT to convey the suspended load to a predetermined conveying destination.

The work machine 100 is equipped with a communication device 60, and can communicate with the management device 200 via a predetermined communication line NW. The work machine 100 can thereby transmit (upload) various types of information to the management device 200, and receive various types of signals (for example, information signals and control signals) and the like from the management device 200.

The communication line NW includes, for example, a wide area network (WAN). The wide area network may include, for example, a mobile communication network whose terminals are base stations. The wide area network may also include, for example, a satellite communication network utilizing communication satellites above the work machine 100. The wide area network may also include, for example, the Internet. The communication line NW may include, for example, a local area network (LAN) of a facility or the like where the management device 200 is installed. The local network may be a wireless line, a wired line, or a line that includes both. The communication line NW may also include, for example, a short distance communication line based on a predetermined wireless communication system such as Wi-Fi (registered trademark) or Bluetooth (registered trademark).

The work machine 100 causes an actuator (for example, a hydraulic actuator) to operate in response to an operator's operation of the operator in the cabin 10, and drives driven elements such as the lower traveling body 1, the upper swing body 3, and the attachment AT.

The work machine 100 may be configured such that the operator in the cabin 10 can operate the work machine 100, and also the remote operation can be performed from outside of the work machine 100. The work machine 100 may be only configured such that the remote operation can be performed from outside of the work machine 100. In a case where the work machine 100 is remotely operated, the interior of the cabin 10 may be unmanned.

The remote operation includes, for example, a mode in which the work machine 100 is operated in response to an input by the user (operator) to a predetermined external device (for example, the management device 200) for activating the actuator of the work machine 100. In such a case, for example, the work machine 100 may transmit image information (hereinafter, "three-dimensional image information") three dimensionally indicating objects existing around the work machine 100 based on output of the space recognition device 40 described below to the external device, and the three-dimensional image information may be displayed on a display device (hereinafter, "remote operation display device") provided on the external device after predetermined image processing is performed on the information. Various information images (information screens) displayed on an output device 50 (display device) in the cabin 10 of the work machine 100 may also be displayed on the remote operation display device of the external device. The operator of the external device can thereby remotely operate the work machine 100 while ascertaining the display contents of peripheral images representing the peripheral of the work machine 100 or various information images displayed on the remote operation display device, for example. The work machine 100 may cause the actuator to operate in response to a remote operation signal indicating the contents of the remote operation received from the external device, and may drive the driven elements such as the lower traveling body 1, the upper swing body 3, and the attachment AT.

The remote operation may also include, for example, a mode in which the work machine 100 is operated by a sound input, a gesture input, or the like to the work machine 100 from a person (for example, a worker) around the work machine 100. Specifically, the work machine 100 recognizes a voice uttered by a nearby worker or the like or a gesture performed by a worker or the like, through a sound input device (for example, a microphone), the imaging device, or the like mounted on the work machine 100. The work machine 100 may then cause the actuator to operate according to the contents of the recognized voice, gesture, or the like to drive the driven elements such as the lower traveling body 1, the upper swing body 3, and the attachment AT.

The work machine 100 may also cause the actuator to operate automatically regardless of the contents of the operator's operation. Accordingly, the work machine 100 provides a function to cause at least one of the driven elements such as the lower traveling body 1, the upper swing body 3, and the attachment AT to operate automatically. That is, what is known as an "automatic driving function" or "machine control (MC) function" is provided.

The automatic driving function may include a function for automatically operating driven elements (actuators) other than the driven element (actuator) to be operated in response to operation or remote operation on an operation device 26 by the operator. That is, what is known as a "semi-automatic driving function" or "operation-assisted MC function" may be included. The automatic driving function may also include a function that automatically causes at least one of the driven elements (hydraulic actuators) to operate without any operation or remote operation on the operation device 26 by the operator. That is, what is known as a "fully automatic driving function" or "fully automatic MC function" may be included. In a case where the fully automatic driving function is enabled in the work machine 100, the interior of the cabin 10 may be unmanned. The semi-automatic driving function, the fully automatic driving function, or the like may include a mode in which the operation contents of the driven element (actuator) that is subject to the automatic driving is automatically determined according to a predetermined rule. Furthermore, the semi-automatic driving function, the fully automatic driving function, or the like may include a mode (what is known as "autonomous driving function") in which the work machine 100 autonomously makes various determinations, and, according to the determination result, the operation contents of the driven element (hydraulic actuator) that is subject to the automatic driving is autonomously determined.

The work machine 100 is, for example, the shovel 100A. As illustrated in FIG. 2 and FIG. 3, the shovel 100A includes a lower traveling body 1A (an example of the lower traveling body 1), an upper swing body 3A (an example of the upper swing body 3) swingably mounted on the lower traveling body 1A via a swing mechanism 2A (an example of the swing mechanism 2), the attachment AT that performs various kinds of work, and the cabin 10.

In the lower traveling body 1A, a pair of left and right crawlers 1C is hydraulically driven by left and right traveling hydraulic motors 1M, respectively. Thereby, the shovel 100A is caused to travel. That is, the crawlers 1C includes a left crawler 1CL and a right crawler 1CR, and the traveling hydraulic motors 1M includes a left traveling hydraulic motor 1ML and a right traveling hydraulic motor 1MR.

Figure 7:
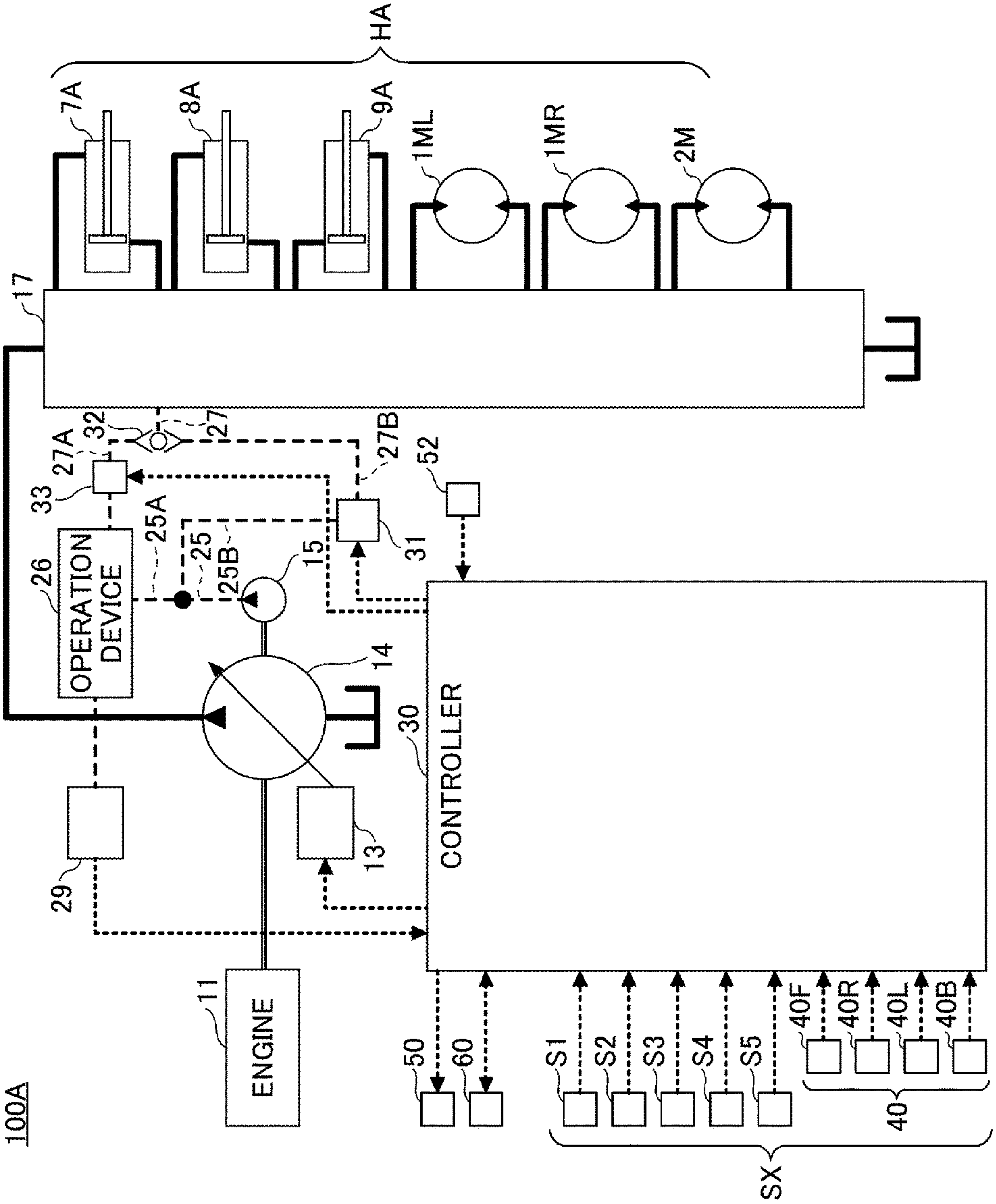
FIG. 7 is a view illustrating a specific example of the configuration of the shovel in FIG. 5.

The upper swing body 3A swings with respect to the lower traveling body 1A by the swing mechanism 2A being hydraulically driven by a swing hydraulic motor 2M (see FIG. 7).

The attachment AT (an example of a work device) includes a boom 4A, an arm 5A, and a bucket 6A as driven elements.

The boom 4A is attached to the front center of the upper swing body 3A to be able to move vertically, the arm 5A is attached to the distal end of the boom 4A to be able to pivot vertically, and the bucket 6A is attached to the distal end of the arm 5A to be able to pivot vertically The bucket 6A is an example of an end attachment. The bucket 6A is used for, for example, excavation work or the like. Instead of the bucket 6A, another end attachment may be attached to the distal end of the arm 5A depending on the work contents or the like. The other end attachment may be another type of bucket such as, for example, a large bucket, a slope finishing bucket, a dredging bucket, or the like. Furthermore, the other end attachment may be an end attachment of a type other than a bucket, such as an agitator, a breaker, or a grapple.

The hook HK for crane work is attached to the bucket 6A. The hook HK is rotatably coupled to a bucket pin that couples the arm 5A and the bucket 6A. Accordingly, the hook HK is stored in a space formed between the two bucket links when work other than crane work (lifting work) such as excavation work or the like is performed.

The boom 4A, the arm 5A, and the bucket 6A are hydraulically driven by a boom cylinder 7A, an arm cylinder 8A, and a bucket cylinder 9A, respectively, serving as hydraulic actuators.

The cabin 10 is an operation room in which the operator rides, and is mounted on, for example, the front left side of the upper swing body 3A.

The space recognition device 40 is attached to the upper portion of the upper swing body 3A, detects objects existing around the shovel 100A in a region from a region relatively close to the shovel 100A to a region relatively far therefrom, and acquires a result of the detection as three-dimensional image information.

The space recognition device 40 may be any device capable of detecting distances to objects existing around the shovel 100A. The space recognition device 40 is, for example, a light detection and ranging (LiDAR).

The space recognition device 40, for example, emits infrared light in a certain direction, and receives the reflected light from an object in that direction, thereby acquiring information on the object around the shovel 100A, specifically, information on the received reflection light (hereinafter, "received light information"). The space recognition device 40 is, for example, a scanning LiDAR, and is a three-dimensional laser scanner capable of scanning in a direction of the infrared laser in the vertical direction and the horizontal direction. The space recognition device 40 may also be what is known as a flash-type LiDAR that emits infrared light from a light emitting module over a wide area of three dimensions and captures reflected light (infrared light) by a three-dimensional range image element.

The received light information includes information on a time from the emission of infrared light to the reception of reflected light (TOF: Time of Flight) for each emission direction of the infrared light and information on intensity of the reflected light received for each emission direction of the infrared light. Thus, the shapes of objects existing in the measurement range and the distances from the space recognition device to the objects can be recognized.

The space recognition device 40 is not limited to the above-described sensor, and may be a stereo camera, a range image camera, a depth camera, or the like. Furthermore, the space recognition device 40 may be, for example, a millimeter wave radar or the like. By using these imaging devices, the shapes and distances of objects existing around the shovel 100A can be detected every time imaging is performed.

In this embodiment, a flash LiDAR is applied as the space recognition device 40, and image information indicating both distances from the space recognition device 40 to objects and shapes of the objects obtained by the flash LiDAR is referred to as three-dimensional image information (an example of detected information). Note that this embodiment does not limit detected information used for processing to three-dimensional image information obtained by the flash LiDAR. The detected information used for the processing may be information including shapes of objects and distances from the space recognition device to the objects, the object being in a detection target region.

Space recognition devices 40F, 40B, 40L, and 40R are included in the space recognition device 40. Each space recognition device of the space recognition device 40 is mounted on the work machine 100 such that a part of the external appearance of the work machine 100 is included in the measurement range.

The space recognition devices 40F, 40B, 40L, and 40R are attached to the upper portion of the front end, the upper portion of the rear end, the upper portion of the left end, and the upper portion of the right end of the upper swing body 3A, respectively, and detect objects in front, behind, on the left side, and on the right side of the upper swing body 3A, respectively. The space recognition device 40F captures an image in a measurement range in front of the upper swing body 3A, for example, a measurement range in a horizontal direction extending from the left front side to the right front side (that is, a circumferential direction viewed from the shovel 100A). The space recognition device 40B captures an image in a measurement range behind the upper swing body 3A, for example, a measurement range in a horizontal direction extending from the left rear side to the right rear side (that is, in the circumferential direction viewed from the shovel 100A). The space recognition device 40L captures an image in, for example, a measurement range on the left side of the upper swing body 3A, for example, a measurement range in a horizontal direction extending from the left front side to the left rear side of the upper swing body 3A (in the circumferential direction viewed from the shovel 100A). The space recognition device 40R captures an image in, for example, a measurement range on the right side of the upper swing body 3A, for example, a measurement range in a horizontal direction extending from the right front side to the right rear side of the upper swing body 3A (in the circumferential direction viewed from the shovel 100A). That is, the space recognition devices 40F, 40B, 40L, and 40R are different in measurement direction and installation position, and are configured to be capable of emitting infrared light in the above-described measurement range. Each space recognition device of the space recognition device 40 mounted on the shovel 100A is attached to the upper portion of the upper swing body 3A such that the optical axis is directed obliquely downward, and is provided to capture an image in a measurement range in the vertical direction including a range from the ground near the shovel 100A to a region far from the shovel 100A. The space recognition devices 40F, 40B, 40L, and 40R mounted on the shovel 100A will be described as examples in which the measurement directions and the installation positions are different, but may be installed such that the measurement ranges are different, and that the measurement directions or the installation positions are different.

The space recognition device 40 outputs three-dimensional image information indicating a detection result at predetermined intervals (for example, 1/30 seconds), for example, from the activation (that is, the key switch is ON) to the stoppage (that is, the key switch is OFF) of the shovel 100A. The three-dimensional image information output of the space recognition device 40 is loaded into a controller 30. The three-dimensional image information output of the space recognition device 40 is transmitted (uploaded) from the controller 30 to the management device 200 through the communication device 60.

The work machine 100 is, for example, the crawler crane 100B.

A crawler crane 100B includes a lower traveling body 1B (an example of the lower traveling body 1), an upper swing body 3B (an example of the upper swing body 3) swingably mounted on the lower traveling body 1B via a swing mechanism 2B (an example of the swing mechanism 2), an attachment AT, a mast 5B, a backstop 6B, a hook HK, a counterweight 9B, and the cabin 10.

The lower traveling body 1B includes, for example, the pair of left and right crawlers 1C. In the lower traveling body 1B, the left and right crawlers 1C are hydraulically driven by the left traveling hydraulic motor 1ML and the right traveling hydraulic motor 1MR, respectively (see FIG. 7). Thereby, the crawler crane 100B is caused to travel.

The swing mechanism 2B is hydraulically driven by the swing hydraulic motor 2M (see FIG. 8), whereby the upper swing body 3B swings with respect to the lower traveling body 1B.

The attachment AT (an example of a work device) includes a boom 4B, and a main winding rope 7B.

The boom 4B is attached to the front center of the upper swing body 3B to be able to be raised and lowered. The main winding rope 7B is suspended from a distal portion of the boom 4B, and the hook HK is attached to the distal end of the main winding rope 7B. That is, the hook HK is attached to the distal end of the boom 4B via the main winding rope 7B.

The base end of the main winding rope 7B is attached to a main winding winch 7Ba attached to the rear surface portion between the base end and the distal end of the boom 4B, and the distal end of the main winding rope 7B is attached to the hook HK. The hook HK can be moved up and down by winding and unwinding the main winding rope 7B by the main winding winch 7Ba that is hydraulically driven by a main winding hydraulic motor 7M (see FIG. 8).

The mast 5B is attached to the upper swing body 3B at a position slightly rearward of the base end of the boom 4B in such a manner as to be rotatable about the rotation axis parallel to the rotation axis of the boom 4B. The distal end portion of the mast 5B is connected to the distal end portion of the boom 4B via a pendant rope 5Ba, and the boom 4B is raised and lowered via the mast 5B by winding and unwinding of a boom derricking rope 5Bb by a boom derricking winch 5Bc that is hydraulically driven by a derricking hydraulic motor 5M (see FIG. 8).

The base end of the backstop 6B is attached to the upper swing body 3B at a position rearward of the base end of the boom 4B in such a manner as to be rotatable about the rotation axis parallel to the rotation axis of the boom 4B, and the distal end of the backstop 6B is attached to the rear surface portion between the base end and the distal end of the boom 4B in such a manner as to be rotatable about the rotation axis parallel to the rotation axis of the boom 4B. The backstop 6B extends and retracts in accordance with the raising and lowering operation of the boom 4B, and has a function to support the boom 4B from the back side when the boom 4B is in a substantially upright state, for example.

The hook HK is attached to the distal end of the main winding rope 7B and used to suspend a suspended load.

The counterweight 9B is provided at the rear end portion of the upper swing body 3B, and has a function to balance the weight of the boom 4B and the suspended load.

The cabin 10 is mounted on, for example, the front right end portion of the upper swing body 3B. In the cabin 10, the operator's seat and the operation device 26 for operating various actuators (see FIG. 8) are provided.

The space recognition device 40 is provided on the upper surface of the counterweight 9B, and monitors the periphery of the crawler crane 100B. In such a case, the crawler crane 100B may transmit, for example, three-dimensional image information of the periphery of the crawler crane 100B based on output of the space recognition device 40 described below to the external device, and the image information may be displayed on the display device provided on the external device.

The space recognition device 40 is attached to the upper surface of the counterweight 9B, and captures an image of the periphery of the crawler crane 100B in a region from a region relatively close to the crawler crane 100B to a region relatively far therefrom to acquire three-dimensional image information. The space recognition device 40 includes the space recognition devices 40B, 40L, and 40R. The space recognition device 40 mounted on the crawler crane 100B is the same as the space recognition device 40 mounted on the shovel 100A described above, and thus the description thereof will be omitted.

The space recognition device 40B, the space recognition device 40L, and the space recognition device 40R are attached to the upper portion of the rear end, the upper portion of the left end, and the upper portion of the right end of the counterweight 9B, respectively, and capture images behind, on the left side, and on the right side of the crawler crane 100B, respectively.

The crawler crane 100B is also provided with the space recognition device 40F for detecting an object existing in front of the crawler crane. The position where the space recognition device 40F is attached may be any position, and for example, may be the upper surface of the counterweight 9B, or may be near the front side of the upper swing body 3B of the crawler crane 100B. The space recognition device 40F captures an image of the front of the crawler crane 100B.

The space recognition device 40B captures an image in a measurement range behind the counterweight 9B, for example, a measurement range in a horizontal direction extending from the left rear side to the right rear side (that is, in the circumferential direction viewed from the crawler crane 100B). The space recognition device 40L captures an image in, for example, a measurement range on the left side of the counterweight 9B, for example, a measurement range in a horizontal direction extending from the left front side to the left rear side of the counterweight 9B (in the circumferential direction viewed from the crawler crane 100B). The space recognition device 40R captures an image in, for example, a measurement range on the right side of the counterweight 9B, for example, a measurement range in a horizontal direction extending from the right front side to the right rear side of the counterweight 9B (in the circumferential direction viewed from the crawler crane 100B). The space recognition device 40F captures an image in a measurement range in front of the upper swing body 3B of the crawler crane 100B, for example, a measurement range in a horizontal direction extending from the left front side to the right front side (that is, in the circumferential direction viewed from the crawler crane 100B). Each space recognition device of the space recognition device 40 mounted on the crawler crane 100B is attached to the upper portion of the counterweight 9B or the upper portion of the upper swing body 3B such that the optical axis is directed obliquely downward, and captures an image in a measurement range in the vertical direction including a range from the ground near the crawler crane 100B to a region far from the crawler crane 100B. The space recognition devices 40F, 40B, 40L, and 40R are configured to be capable of emitting infrared light in the above-described measurement range. The space recognition devices 40F, 40B, 40L, and 40R mounted on the crawler crane 100B will be described as examples in which the measurement directions and the installation positions are different, but may be installed such that the measurement ranges are different, and that the measurement directions or the installation positions are different.

The space recognition device 40 outputs three-dimensional image information at predetermined intervals (for example, 1/30 seconds), for example, from the activation (that is, the key switch is ON) to the stoppage (that is, the key switch is OFF) of the crawler crane 100B. The three-dimensional image information output of the space recognition device 40 is loaded into the controller 30. The three-dimensional image information output of the space recognition device 40 is transmitted (uploaded) from the controller 30 to the management device 200 through the communication device 60.

Note that the crawler crane 100B is assembled according to the site. Therefore, the number of weights stacked on as the counterweight 9B varies depending on the site. The position and pose of the space recognition device 40 mounted on the counterweight 9B also differ depending on the site.

The management device 200 according to this embodiment therefore specifies the position and pose of the space recognition device 40 based on the three-dimensional image information obtained by the space recognition device 40 of the work machine 100 (including the crawler crane 100B).

<Overview of Management Apparatus>

The management device 200 is an example of an information processing device, and performs management related to the work machine 100, such as management (monitoring) of the state of the work machine 100 and management (monitoring) of the work of the work machine 100, for example.

The management device 200 may be, for example, an on-premise server or a cloud server placed at a management center or the like outside the worksite of the work machine 100. The management device 200 may also be, for example, an edge server placed at the worksite of the work machine 100 or at a place relatively close to the worksite (for example, a building, a base station, or the like of a communication carrier). The management device 200 may be a stationary-type terminal device that is placed at a management office or the like in the worksite of the work machine 100, or a portable-type terminal device (mobile device). The stationary-type terminal device may include, for example, a desktop-type computer terminal. The portable-type terminal device may include, for example, a smartphone, a tablet terminal, a laptop-type computer terminal, and the like.

The management device 200 includes, for example, a communication device 220 (see FIG. 5 and FIG. 6), and communicates with the work machine 100 via the communication line NW as described above. Accordingly, the management device 200 can receive various types of information uploaded from the work machine 100 and transmit various types of signals to the work machine 100. Therefore, the user of the management device 200 can ascertain various kinds of information on the work machine 100 through an output device 240 (see FIG. 5 and FIG. 6). For example, the management device 200 can also transmit an information signal to the work machine 100 to provide information necessary for work or transmit a control signal to the work machine 100 to control the work machine 100. The user of the management device 200 may include, for example, an owner of the work machine 100; a manager of the work machine 100; an engineer of a manufacturer of the work machine 100; an operator of the work machine 100; a manager; a supervisor; and a worker of the worksite where the work machine 100 is; and the like.

The management device 200 may also be configured to be able to support remote operation of the work machine 100. For example, the management device 200 may include an input device for an operator to perform remote operation (hereinafter referred to as a "remote operation device" for convenience) and a remote operation display device that displays image information representing the periphery of the work machine 100, and the like. The signal input from the remote operation device is transmitted to the work machine 100 as a remote operation signal. Thus, the user (operator) of the management device 200 can remotely operate the work machine 100 using the remote operation device while ascertaining the situation around the work machine 100 on the remote operation display device.

Furthermore, the management device 200 may be configured to be able to support remote monitoring of the work machine 100 that works fully automatically. For example, the management device 200 may include a display device (hereinafter, "display device for monitoring") that displays image information representing the periphery of the work machine 100 and the like. Accordingly, the user (monitoring person) of the management device 200 can monitor the work of the work machine 100 on the display device for monitoring. For example, the management device 200 may include an input device (hereinafter, referred to as an "intervention operation device" for convenience) for performing an intervention operation with respect to the operation by the automatic driving function of the work machine 100. The intervention operation device may include, for example, an input device for making an emergency stop of the work machine 100. The intervention operation device may also include the above-described remote operation device. Accordingly, when an abnormality occurs in the work machine 100, when the operation of the work machine 100 is inappropriate or the like, the user (monitoring person) of the management device 200 can perform an emergency stop of the work machine 100 or perform a remote operation for causing the work machine 100 to perform an appropriate operation.

A control device 210 of the management device 200 also performs various processing based on the three-dimensional image information from the space recognition device 40 of the work machine 100. For example, the control device 210 of the management device 200 specifies the position and the pose of the space recognition device 40 provided on the work machine 100 based on the shape of a part of the work machine 100 included in the received three-dimensional image information (an example of the detected information). Note that, in this embodiment, an example of specifying the position and the pose will be described, but the present disclosure is not limited to the method of specifying the position and the pose, and the position or the pose may be specified. That is, even when the position or the pose is specified, the operator can use the specified position or the specified pose for adjusting the position or the pose of the space recognition device 40.

The control device 210 of the management device 200 also combines the three-dimensional image information of each space recognition device 40 provided on the work machine 100, and generates three-dimensional combined image information (an example of three-dimensional shape combined information) representing the environment around the work machine 100. The image information representing the periphery of the work machine 100 based on the three-dimensional combined image information may be displayed on the display device for monitoring. The management device 200 may also transmit the three-dimensional combined image information to the work machine 100, and the image information based on the three-dimensional combined image information may be displayed on the output device 50 (display device) of the work machine 100.

[Configuration of Peripheral Monitoring System]

A configuration of the peripheral monitoring system SYS will now be described with reference to FIG. 5 to FIG. 8.

Figure 5:
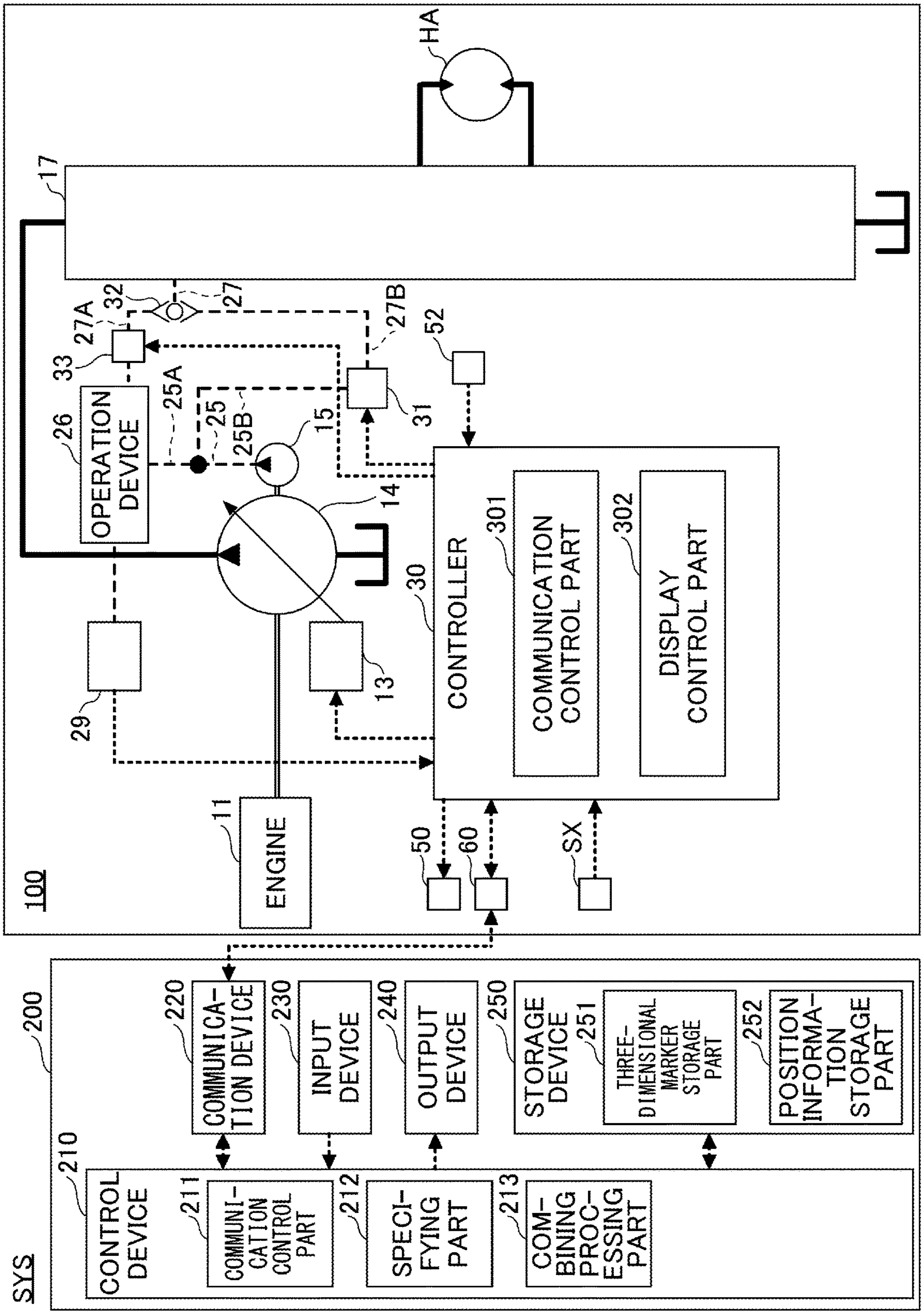
FIG. 5 is a block diagram illustrating an example of a configuration of the peripheral monitoring system according to the embodiment.
Figure 6:
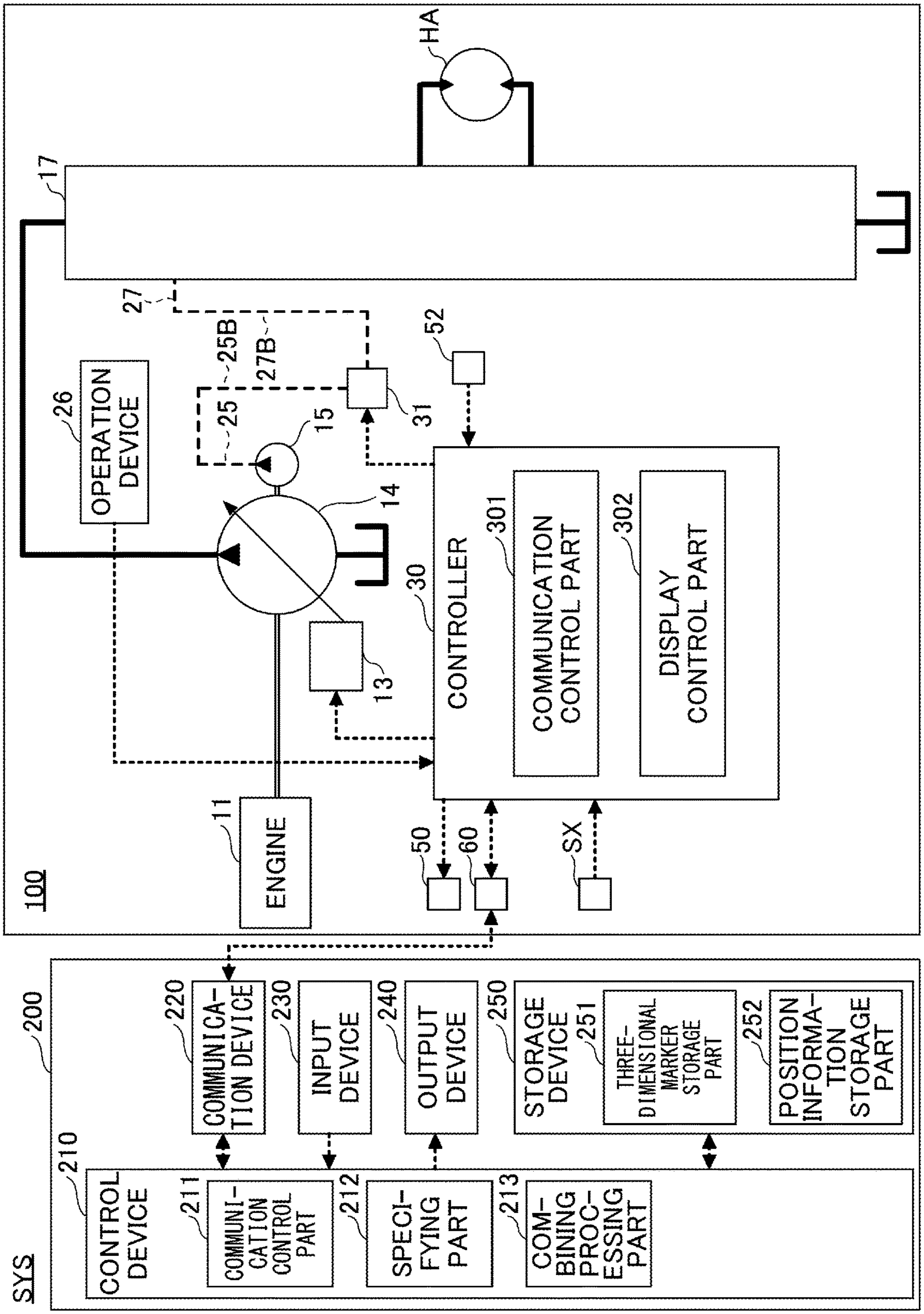
FIG. 6 is a block diagram illustrating another example of the configuration of the peripheral monitoring system according to the embodiment.
Figure 8:
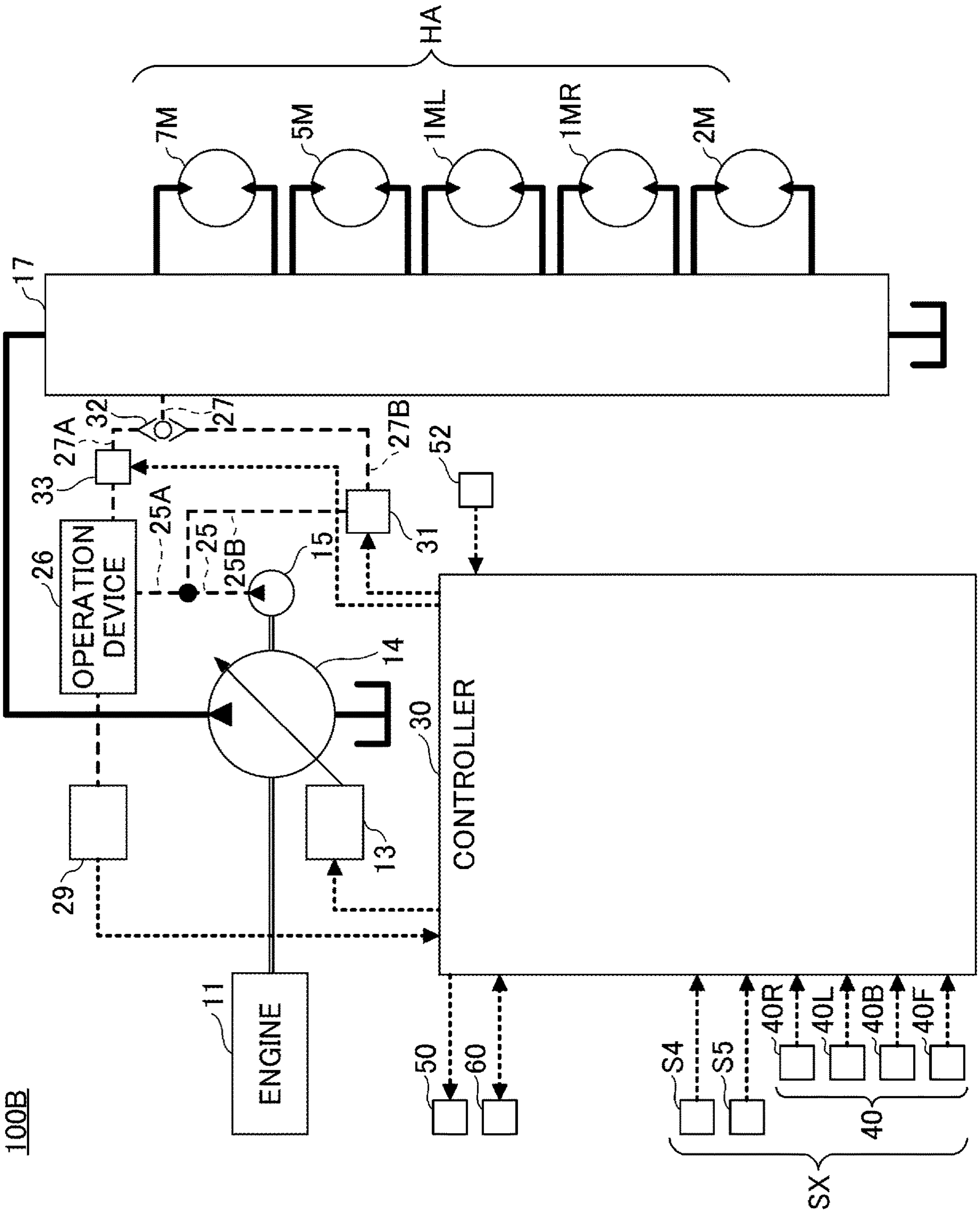
FIG. 8 is a view illustrating a specific example of the configuration of the crawler crane in FIG. 6.

FIG. 5 and FIG. 6 are block diagrams illustrating examples of the configuration of the peripheral monitoring system SYS according to this embodiment. Specifically, FIG. 7 is a diagram illustrating an example of a configuration of the shovel 100A. FIG. 7 illustrates a specific example of the configuration of the shovel 100A corresponding to FIG. 5. FIG. 8 is a diagram illustrating an example of a configuration of the crawler crane 100B. Specifically, FIG. 8 is a diagram illustrating a specific example of the configuration of the crawler crane 100B corresponding to FIG. 6.

In FIG. 5 to FIG. 8, a path through which mechanical power is transmitted is indicated by a double line, a path through which high-pressure hydraulic oil for driving the hydraulic actuator flows is indicated by a solid line, a path through which pilot pressure is transmitted is indicated by a dashed line, and a path through which an electric signal is transmitted is indicated by a dotted line. FIG. 5 and FIG. 6 are different from each other only in the configuration related to the work machine 100 (operation device 26) among the work machine 100 and the management device 200. Therefore, the drawings illustrating specific examples of the configurations of the shovel 100A and the crawler crane 100B corresponding to FIG. 5 are omitted.

<Configuration of Work Machine>

The work machine 100 includes components such as a hydraulic drive system related to hydraulic drive of a driven element, an operation system related to operation of the driven element, a user interface system related to exchange of information with a user, a communication system related to communication with the outside, a control system related to various controls, and the like.

<<Hydraulic Drive System>>

As illustrated in FIG. 5 and FIG. 6, the hydraulic drive system of the work machine 100 according to this embodiment includes a hydraulic actuator HA that hydraulically drives the driven elements such as the lower traveling body 1 (left and right crawlers 1C), the upper swing body 3, and the attachment AT, as described above. The hydraulic drive system of the work machine 100 according to this embodiment includes an engine 11, a regulator 13, a main pump 14, and a control valve 17.

As illustrated in FIG. 7, in a case where the work machine 100 is the shovel 100A, the hydraulic actuator HA includes the traveling hydraulic motors 1ML and 1MR, the swing hydraulic motor 2M, the boom cylinder 7A, the arm cylinder 8A, the bucket cylinder 9A, and the like.

As illustrated in FIG. 8, in a case where the work machine 100 is the crawler crane 100B, the hydraulic actuator HA includes the traveling hydraulic motors 1ML and 1MR, the swing hydraulic motor 2M, the derricking hydraulic motor 5M, the main winding hydraulic motor 7M, and the like.

The engine 11 is a motor and is a main power source in the hydraulic drive system. The engine 11 is, for example, a diesel engine fueled with diesel fuel. The engine 11 is mounted on, for example, the rear portion of the upper swing body 3. The engine 11 constantly rotates at a predetermined target speed under direct or indirect control of the controller 30 described below to drive the main pump 14 and a pilot pump 15.

The regulator 13 controls (adjusts) the discharge of the main pump 14 under the control of the controller 30. For example, the regulator 13 adjusts the angle of a swash plate of the main pump 14 (Hereinafter, referred to as a "tilt angle") in response to a control instruction from the controller 30.

The main pump 14 supplies hydraulic oil to the control valve 17 through a high-pressure hydraulic line. The main pump 14 is, for example, mounted on the rear portion of the upper swing body 3 in the same manner as the engine 11. As described above, the main pump 14 is driven by the engine 11. The main pump 14 is, for example, a variable displacement hydraulic pump, and as described above, under the control of the controller 30, the regulator 13 adjusts the tilt angle of the swash plate, thereby adjusting the stroke length of the piston and controlling the discharge flow rate (discharge pressure).

The control valve 17 is a hydraulic control device that controls one or more of hydraulic actuators HA in response to contents of the operation or the remote operation on the operation device 26 by the operator or an operation instruction related to the automatic driving function output of the controller 30. The control valve 17 is mounted on, for example, the central portion of the upper swing body 3. As described above, the control valve 17 is connected to the main pump 14 via the high-pressure hydraulic line, and selectively supplies the hydraulic oil supplied from the main pump 14 to each hydraulic actuator in response to the operation of the operator or the operation instruction output of the controller 30. Specifically, the control valve 17 includes control valves (also referred to as "direction switching valves") that each controls the flow rate and the flow direction of the hydraulic oil supplied from the main pump 14 to the respective hydraulic actuators HA.

<<Operation System>>

As illustrated in FIG. 5 and FIG. 6, the operation system of the work machine 100 according to this embodiment includes the pilot pump 15, the operation device 26, and a hydraulic pressure control valve 31. As illustrated in FIG. 5, the operation system of the work machine 100 according to this embodiment includes a shuttle valve 32 and a hydraulic pressure control valve 33 in a case where the operation device 26 is of a hydraulic pilot type.

The pilot pump 15 supplies pilot pressure to various hydraulic devices via a pilot line 25. The pilot pump 15 is mounted on, for example, the rear portion of the upper swing body 3 in the same manner as the engine 11. The pilot pump 15 is, for example, a fixed displacement hydraulic pump, and is driven by the engine 11 as described above.

Note that the pilot pump 15 may be omitted. In such a case, relatively low-pressure hydraulic oil obtained by reducing the pressure of relatively high-pressure hydraulic oil discharged from the main pump 14 by a predetermined pressure reducing valve is supplied to the various hydraulic devices as a pilot pressure.

The operation device 26 is provided in the vicinity of the operator's seat in the cabin 10, and is used by the operator to operate various driven elements. In other words, the operation device 26 is used by the operator to operate the hydraulic actuators HA that drive the respective driven elements. The operation device 26 includes a pedal device and a lever device for operating the respective driven elements (hydraulic actuators HA).

For example, as illustrated in FIG. 5, the operation device 26 is a hydraulic pilot type. Specifically, the operation device 26 uses the hydraulic oil supplied from the pilot pump 15 via the pilot line 25 and a pilot line 25A branched from the pilot line 25, to output the pilot pressure according to the operation contents to a pilot line 27A on a secondary side. The pilot line 27A is connected to one of inlet ports of the shuttle valve 32, and connected to the control valve 17 via a pilot line 27 connected to an outlet port of the shuttle valve 32. Thus, the pilot pressure according to the operation contents related to the various driven elements (hydraulic actuators) on the operation device 26 can be input to the control valve 17 via the shuttle valve 32. Therefore, the control valve 17 can drive the respective hydraulic actuators HA according to the operation contents on the operation device 26 by the operator or the like.

For example, as illustrated in FIG. 6, the operation device 26 is an electric type. Specifically, the operation device 26 outputs an electric signal (hereinafter, referred to as an "operation signal") according to the operation contents, and the operation signal is loaded into the controller 30. The controller 30 then outputs a control instruction according to the contents of the operation signal, that is, a control signal according to the operation contents on the operation device 26 to the hydraulic pressure control valve 31. Accordingly, the pilot pressure according to the operation contents on the operation device 26 is input from the hydraulic pressure control valve 31 to the control valve 17, and the control valve 17 can drive the respective hydraulic actuators HA according to the operation contents of the operation device 26.

The control valves (direction switching valves) provided in the control valve 17 driving the hydraulic actuators may be of an electromagnetic solenoid type. In such a case, an operation signal output of the operation device 26 may be directly input to the control valve 17, that is, the control valves of the electromagnetic solenoid type.

The hydraulic pressure control valve 31 is provided for each driven element (hydraulic actuator HA) to be operated by the operation device 26. For example, the hydraulic pressure control valve 31 may be provided in a pilot line 25B between the pilot pump 15 and the control valve 17, and may be configured to be able to change the size of the flow path area (that is, a cross-sectional area in which the hydraulic oil can flow). Accordingly, the hydraulic pressure control valve 31 can output predetermined pilot pressure to a pilot line 27B on the secondary side by using the hydraulic oil of the pilot pump 15 supplied via the pilot line 25B. Therefore, as illustrated in FIG. 5, the hydraulic pressure control valve 31 can indirectly apply predetermined pilot pressure according to the control signal from the controller 30 to the control valve 17 via the shuttle valve 32 between the pilot line 27B and the pilot line 27. In contrast, as illustrated in FIG. 6, the hydraulic pressure control valve 31 can directly apply predetermined pilot pressure according to the control signal from the controller 30 to the control valve 17 via the pilot line 27B and the pilot line 27. Therefore, the controller 30 can supply the pilot pressure according to the operation contents on the operation device 26 of the electric type from the hydraulic pressure control valve 31 to the control valve 17, and the operation of the work machine 100 based on the operation of the operator can be achieved.

As illustrated in FIG. 5, the shuttle valve 32 has two inlet ports and one outlet port, and outputs, from the outlet port, the hydraulic oil having a higher pilot pressure among the pilot pressure applied to the two inlet ports. The shuttle valve 32 is provided for each driven element (hydraulic actuator HA) to be operated by the operation device 26. One of the two inlet ports of the shuttle valve 32 is connected to the pilot line 27A on the secondary side of the operation device 26 (Specifically, the above-described lever device or pedal device included in the operation device 26), and the other of the two is connected to the pilot line 27B on the secondary side of the hydraulic pressure control valve 31. The outlet port of the shuttle valve 32 is connected to the pilot port of a corresponding control valve of the control valve 17 via the pilot line 27. The corresponding control valve is a control valve for driving a hydraulic actuator to be operated by the above-described lever device or the pedal device connected to one of the inlet ports of the shuttle valve 32. Therefore, each of the shuttle valves 32 can apply, to the pilot port of the corresponding control valve, the higher one of the pilot pressure of the pilot line 27A on the secondary side of the operation device 26 and the pilot pressure of the pilot line 27B on the secondary side of the hydraulic pressure control valve 31. That is, the controller 30 can control the corresponding control valve regardless of the operation on the operation device 26 by the operator by outputting, from the hydraulic pressure control valve 31, pilot pressure higher than the pilot pressure on the secondary side of the operation device 26.

As illustrated in FIG. 5, the hydraulic pressure control valve 33 is provided in the pilot line 27A connecting the operation device 26 and the shuttle valve 32. The hydraulic pressure control valve 33 is configured to be able to change the size of the flow path area, for example. The hydraulic pressure control valve 33 operates in response to a control signal input from the controller 30. Thus, when the operation device 26 is operated by the operator, the controller 30 can forcibly reduce the pilot pressure output from the operation device 26.

<<User Interface System>>

As illustrated in FIG. 5 and FIG. 6, the user interface system of the work machine 100 according to this embodiment includes the operation device 26, the output device 50, and an input device 52.

The output device 50 outputs various types of information to a user (operator) of the work machine 100 inside the cabin 10.

For example, the output device 50 includes an indoor lighting device, a display device, or the like that is provided at a position easily visible from the seated operator in the cabin 10 and outputs various kinds of visual information. The lighting device is, for example, a warning lamp, or the like. The display device is, for example, a liquid crystal display, an organic electroluminescence (EL) display, or the like.

The output device 50 also includes, for example, a sound output device that outputs various kinds of auditory information. The sound output device includes, for example, a buzzer and a speaker.

The output device 50 also includes, for example, a device that outputs various kinds of information in a tactile manner, such as vibration of the operator's seat.

The input device 52 is provided in a range close to an operator seated in the cabin 10, receives various inputs from the operator, and signals in response to the received inputs are output to the controller 30.

For example, the input device 52 is an operation input device that receives an operation input. The operation input device may include a touch panel implemented on the display device, a touch pad provided around the display device, a button switch, a lever, a toggle, a knob switch provided on the operation device 26 (lever device), and the like.

The input device 52 may be, for example, a voice input device that receives an operator's voice input. The voice input device includes, for example, a microphone.

Furthermore, the input device 52 may be, for example, a gesture input device that receives an operator's gesture input. The gesture input device includes, for example, an imaging device (indoor camera) installed in the cabin 10.

<<Communication System>>

As illustrated in FIG. 5 and FIG. 6, the communication system of the work machine 100 according to this embodiment includes the communication device 60.

The communication device 60 is connected to the communication line NW and communicates with a device (for example, the management device 200) provided separately from the work machine 100. The device provided separately from the work machine 100 may include a portable terminal device brought into the cabin 10 by a user of the work machine 100 in addition to a device outside the work machine 100. The communication device 60 may include, for example, a mobile communication module conforming to a communication standard such as 4th Generation (4G) or 5th Generation (5G). The communication device 60 may also include, for example, a satellite communication module. Furthermore, the communication device 60 may include, for example, a Wi-Fi (registered trademark) communication module, a Bluetooth (registered trademark) communication module, and the like.

<<Control System>>

As illustrated in FIG. 5 and FIG. 6, the control system of the work machine 100 according to this embodiment includes the controller 30. The control system of the work machine 100 according to this also includes an acquisition device SX. As illustrated in FIG. 7, the control system of the work machine 100 according to this embodiment further includes an operation pressure sensor 29 in a case where the operation device 26 is a hydraulic pilot type.

The controller 30 performs various types of control with respect to the work machine 100. The functions of the controller 30 may be implemented by any given hardware, any combination of hardware and software, or the like. For example, the controller 30 is mainly constituted by a computer including one or more processors such as a central processing unit (CPU), a memory device such as a random access memory (RAM), a nonvolatile auxiliary storage device such as a read only memory (ROM), I/O interface devices, and the like. The controller 30 performs various functions by, for example, loading a program installed in the auxiliary storage device onto the memory device and executing the program by the CPU.

The controller 30 performs control related to the operation of the hydraulic actuator HA (driven element) of the work machine 100, for example, by controlling the hydraulic pressure control valve 31.

Specifically, the controller 30 may perform control related to the operation of the hydraulic actuator HA (driven element) of the work machine 100 based on the operation of the operation device 26, by controlling the hydraulic pressure control valve 31.

The controller 30 performs, for example, control for communication with the management device 200 and control for displaying information on the output device 50 (display device). The controller 30 includes a communication control part 301 and a display control part 302. The functions of the communication control part 301 and the display control part 302 are implemented by, for example, loading a program installed in the auxiliary storage device onto the memory device and executing the program by the CPU.

A part of the functions of the controller 30 may be implemented by another controller (control device). That is, the functions of the controller 30 may be implemented by multiple controllers in a distributed manner.

As illustrated in FIG. 5, the operation pressure sensor 29 detects the pilot pressure on the secondary side (pilot line 27A) of the hydraulic pilot type operation device 26, that is, the pilot pressure according to the operation state of each of the driven elements (hydraulic actuators) in the operation device 26. A detection signal of the pilot pressure according to the operation state of each of the driven elements (hydraulic actuators HA) in the operation device 26 by the operation pressure sensor 29 is loaded into the controller 30.

The acquisition device SX acquires information on the state of the work machine 100, the situation around the work machine 100, and the like. Output of the acquisition device SX is loaded into the controller 30.

As illustrated in FIG. 7, in a case where the work machine 100 is the shovel 100A, the acquisition device SX includes a boom angle sensor S1, an arm angle sensor S2, a bucket angle sensor S3, a machine body inclination sensor S4, a swing state sensor S5, and the space recognition device 40.

As illustrated in FIG. 8, in a case where the work machine 100 is the crawler crane 100B, the acquisition device SX includes the machine body inclination sensor S4, the swing state sensor S5, and the space recognition device 40.

The boom angle sensor S1 acquires detected information on an attitude angle of the boom 4A (hereinafter referred to as a "boom angle") with respect to a predetermined condition (for example, a horizontal plane, a state of one of both ends of a movable angle range of the boom 4A, or the like). The boom angle sensor S1 may include, for example, a rotary encoder, an accelerometer, an angular velocity sensor, a six-axis sensor, an inertial measurement unit (IMU), and the like. The boom angle sensor S1 may also include a cylinder sensor capable of detecting an extended/retracted position of the boom cylinder 7A.

The arm angle sensor S2 acquires detected information on an attitude angle of the arm 5A (hereinafter referred to as an "arm angle") with respect to a predetermined condition (for example, a straight line connecting connection points at both ends of the boom 4A, a state of one of both ends of a movable angle range of the arm 5A, or the like). The arm angle sensor S2 may include, for example, a rotary encoder, an accelerometer, an angular velocity sensor, a six-axis sensor, an IMU, and the like. The arm angle sensor S2 may also include a cylinder sensor capable of detecting an extended/retracted position of the arm cylinder 8A.

The bucket angle sensor S3 acquires detected information on an attitude angle of the bucket 6A (hereinafter, referred to as a "bucket angle") with respect to a predetermined condition (for example, a straight line connecting connection points at both ends of the arm 5A, a state of one of both ends of a movable angle range of the bucket 6A, or the like). The bucket angle sensor S3 may include, for example, a rotary encoder, an accelerometer, an angular velocity sensor, a six-axis sensor, an IMU, and the like. The bucket angle sensor S3 may also include a cylinder sensor capable of detecting an extended/retracted position of the bucket cylinder 9A.

The machine body inclination sensor S4 acquires detected information on an inclination state of the machine body of the work machine 100 (for example, the shovel 100A or the crawler crane 100B) including the lower traveling body 1 and the upper swing body 3. The machine body inclination sensor S4 is mounted on the upper swing body 3, for example, and acquires detected information on inclination angles in the front-rear direction and the left-right direction (hereinafter, "front-rear inclination angle" and "left-right inclination angle") of the upper swing body 3. The machine body inclination sensor S4 may include, for example, an accelerometer (inclination sensor), an angular velocity sensor, a six-axis sensor, an IMU, and the like.

The swing state sensor S5 acquires detected information on a swing state of the upper swing body 3 of the work machine 100 (for example, the shovel 100A or the crawler crane 100B). The swing state sensor S5 acquires, for example, detected information on a swing angle of the upper swing body 3 with respect to a predetermined condition (for example, a state in which the forward traveling direction of the lower traveling body 1 coincides with the front side of the upper swing body 3). The swing state sensor S5 includes, for example, a potentiometer, a rotary encoder, a resolver, and the like.

In a case where the machine body inclination sensor S4 includes an additional component (for example, a six-axis sensor, an IMU, or the like) capable of acquiring detected information on the attitude state of the upper swing body 3 including not only the inclination angle but also the swing angle of the upper swing body 3, the swing state sensor S5 may be omitted.

Figure 2:
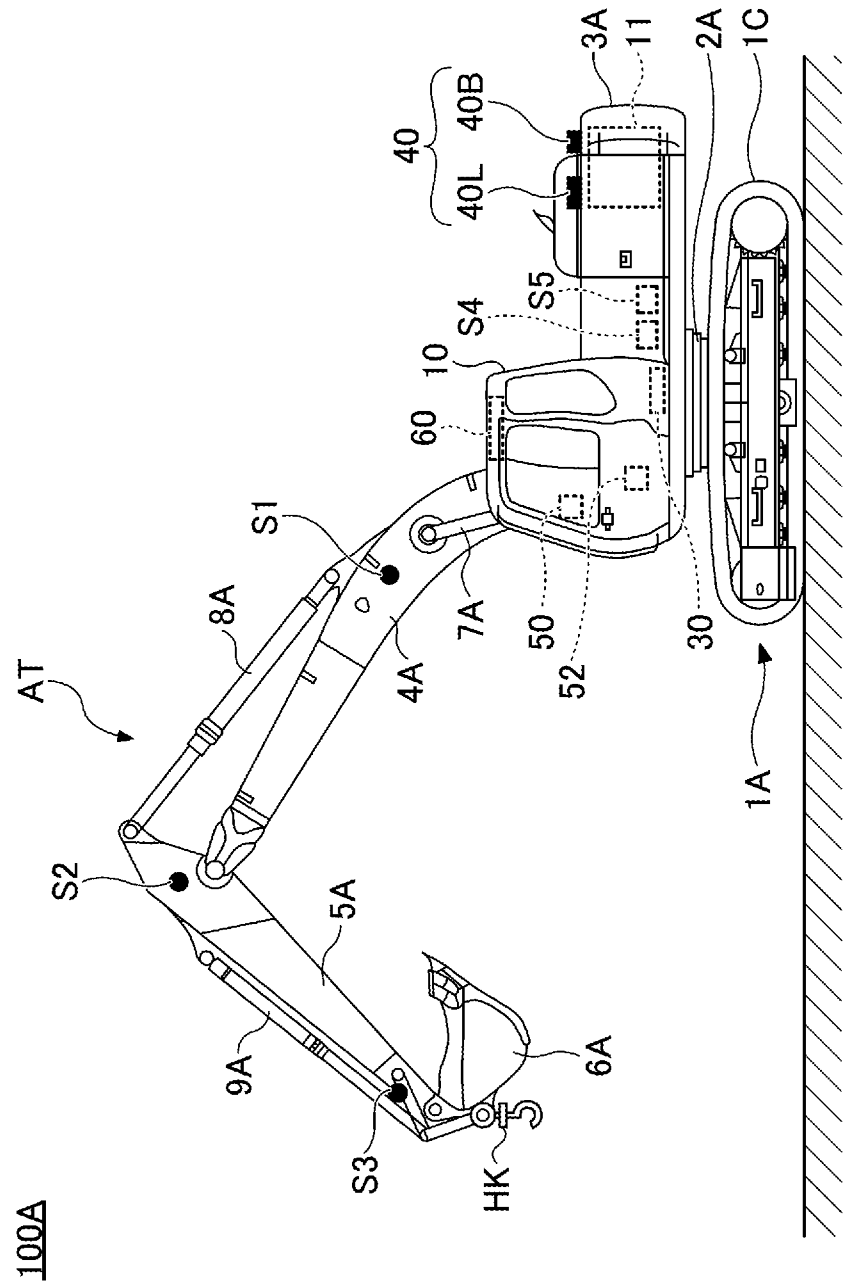
FIG. 2 is a side view illustrating an example of a shovel according to the embodiment.
Figure 3:
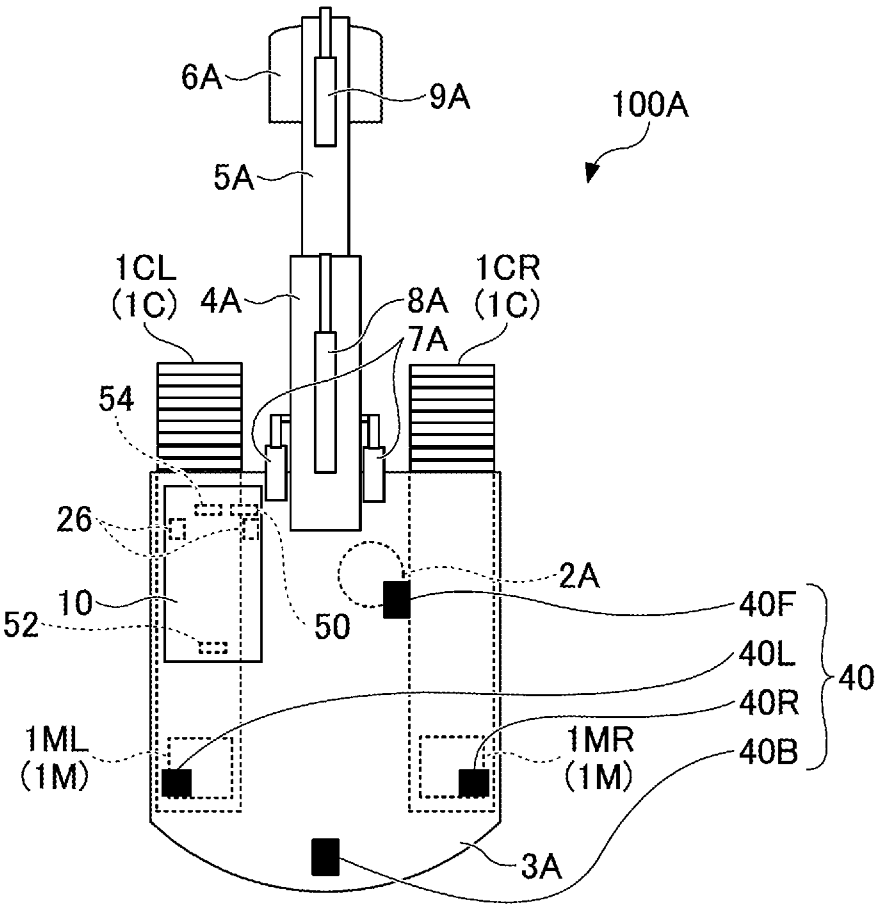
FIG. 3 is a top view illustrating the example of the shovel according to the embodiment.
Figure 4:
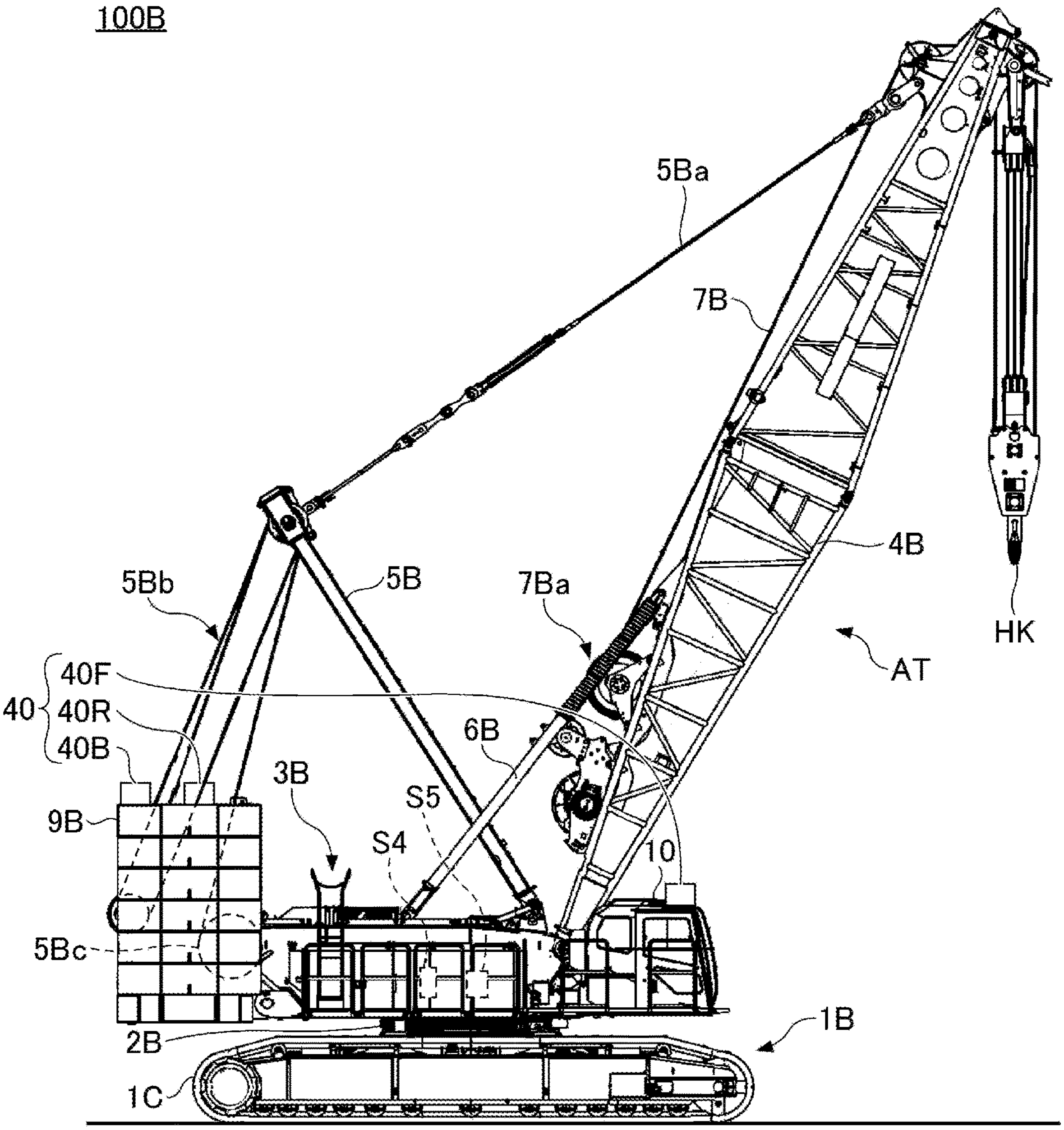
FIG. 4 is a side view illustrating an example of a crawler crane according to the embodiment.

As illustrated in FIG. 2 and FIG. 3, the space recognition devices 40F, 40B, 40L, and 40R of the shovel 100A are attached to the upper portion of the front end, the upper portion of the rear end, the upper portion of the left end, and the upper portion of the right end of the upper swing body 3A, respectively, and acquire three-dimensional image information representing the periphery of the shovel 100A. As illustrated in FIG. 4, the space recognition device 40B, the space recognition device 40L, and the space recognition device 40R of the crawler crane 100B are attached to, for example, the counterweight 9B, and acquire three-dimensional image information representing the periphery of the crawler crane 100B.

The communication control part 301 performs control for transmitting and receiving information to and from the management device 200.

The display control part 302 performs control for displaying information on the output device 50 (display device). The information to be displayed includes image information that has been subjected to image processing based on the three-dimensional image information acquired by the space recognition device 40, and the like.

In this embodiment, by displaying image information that has been subjected to the image processing based on the three-dimensional image information acquired by the space recognition device 40 and visualizing the situation around the work machine 100, it is possible to reduce the operator's work required for performing operation and improve security.

In this embodiment, in order to seamlessly display the situation around the work machine 100, the three-dimensional image information respectively captured by each space recognition device 40 is combined. In order to combine the three-dimensional image information, it is necessary to hold information indicating the position and pose respectively captured by each space recognition device 40 in advance. However, since the crawler crane 100B of the work machine 100 is reassembled every time for each site, the position and pose of each space recognition device 40 are different every time. Therefore, it is difficult to hold information indicating the position and the pose of each space recognition device 40 in advance. Furthermore, in the shovel 100A, the position or the pose of the space recognition device 40 may be changed according to a user's request, or the pose or the like of the space recognition device 40 may be changed during work.

Therefore, in this embodiment, the work machine 100 transmits the three-dimensional image information captured by each space recognition device 40 to the management device 200, thereby specifying the position and the pose of each space recognition device 40.

In this embodiment, an example in which the management device 200 combines three-dimensional image information to generate three-dimensional combined image information after the position and the pose of each space recognition device 40 are specified will be described.

The three-dimensional combined image information (an example of three-dimensional shape combined information) is image information obtained by combining the three-dimensional image information based on the position and the pose of each space recognition device 40, and is image information representing shapes of objects and distances between the objects and the work machine 100, the object existing around the work machine 100. In this embodiment, it is possible to generate image information representing the situation around the work machine 100 from an arbitrary viewpoint in response to an operation from the user.

<Configuration of Management Apparatus>

As illustrated in FIG. 5 and FIG. 6, the management device 200 includes the control device 210, the communication device 220, an input device 230, the output device 240, and a storage device 250.

The communication device 220 is connected to the communication line NW and communicates with the outside of the management device 200 (for example, the work machine 100).

The input device 230 receives input by a manager, a worker, or the like of the management device 200, and outputs a signal representing the contents of the input (for example, an operation input, a voice input, a gesture input, or the like). A signal representing the contents of the input is loaded into the control device 210.

The output device 240 outputs various kinds of information to the user of the management device 200.

The output device 240 includes, for example, a lighting device or a display device that outputs various types of visual information to the user of the management device 200. The lighting device includes, for example, a warning lamp or the like. The display device includes, for example, a liquid crystal display or an organic EL display. The output device 240 includes a sound output device that outputs various kinds of auditory information to the user of the management device 200. The sound output device includes, for example, a buzzer and a speaker.

The display device displays various information images related to the management device 200. The display device may include, for example, the remote operation display device and the display device for monitoring, and the display device for monitoring may display image information around the work machine 100 uploaded from the work machine 100 under the control of the control device 210.

The control device 210 performs various types of control related to the management device 200. The functions of the control device 210 are implemented by any given hardware, any combination of hardware and software, or the like. For example, the control device 210 is mainly constituted by a computer including one or more processors such as a CPU, a memory device such as a RAM, a nonvolatile auxiliary storage device such as a ROM, I/O interface devices, and the like. The control device 210 performs various functions by, for example, loading a program stored in the auxiliary storage device onto the memory device and executing the program by the CPU.

The storage device 250 is a nonvolatile auxiliary storage device such as a solid state drive (SSD) or a hard disk drive (HDD), and includes a three-dimensional marker storage part 251 and a position information storage part 252.

The three-dimensional marker storage part 251 stores three-dimensional markers representing the shape of the work machine 100. The three-dimensional marker is information (an example of information of the work machine) that holds, in advance, the three-dimensional shape of the external appearance of the work machine 100 represented in a reference coordinate system. The three-dimensional marker does not need to hold the entire three-dimensional shape of the external appearance of the work machine 100, and may hold, for example, information representing the shape of the external appearance of the work machine 100 that is highly likely to be included in the measurement range of the space recognition device 40.

The position information storage part 252 stores information indicating the position and pose of the space recognition device 40 provided on the work machine 100. The control device 210 of this embodiment is updated each time the position and the pose of the space recognition device 40 are specified.

Figure 9:
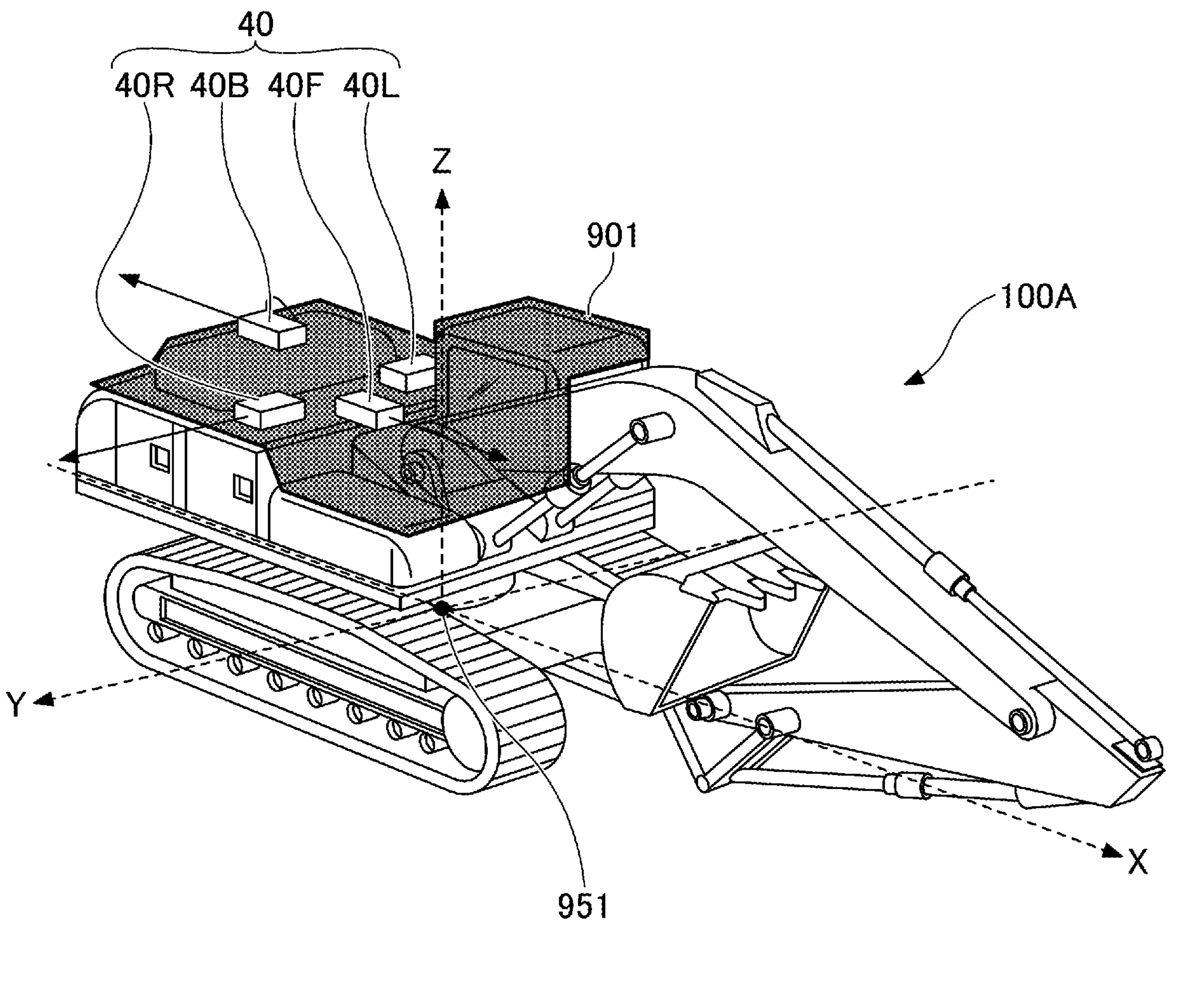
FIG. 9 is a conceptual diagram illustrating a three-dimensional marker stored in a three-dimensional marker storage part according to the embodiment.

FIG. 9 is a conceptual diagram illustrating the three-dimensional marker stored in the three-dimensional marker storage part 251 according to this embodiment. FIG. 9 illustrates a partial region 901 of the shovel 100A serving as a three-dimensional marker. The three-dimensional marker of the partial region 901 is illustrated in the reference coordinate system. The reference coordinate system is a three-dimensional coordinate system for specifying the position of the structure of the shovel 100A indicated by the three-dimensional marker, and indicates a coordinate system in which the front-rear direction of the shovel 100A is set as the X-axis, the widthwise direction thereof is set as the Y-axis, and the height direction thereof is set as the Z-axis. The reference coordinate system illustrated in FIG. 9 is, for example, a coordinate system in which a center position 951 on an installation surface of the shovel 100A is set as the origin, but this is illustrated as an example, and another point may be the origin.

In the example illustrated in FIG. 9, the three-dimensional marker indicating the shape and the position of the partial region 901 which is a part of the external appearance of the shovel 100A is stored in the three-dimensional marker storage part 251. The three-dimensional marker may be generated based on a result of detection performed by the space recognition device 40, for example. The method of generating the three-dimensional marker is not limited to the method of generating the three-dimensional marker based on the result of detection performed by the space recognition device 40. For example, the shape of the partial region 901 which is a part of the external appearance of the shovel 100A may be generated with three-dimensional computer aided design (CAD) data of the shovel 100A. By using the above-mentioned method of generating the maker, the work required for generation can be reduced. In this embodiment, the space recognition device 40 is provided on the upper surface of the work machine. Therefore, the three-dimensional marker stored in the three-dimensional marker storage part 251 is generated so as to include at least a shape representing the upper surface of the shovel 100A.

The partial region 901 includes the shape of the shovel 100A included in the measurement range of the space recognition devices 40F, 40B, 40L, and 40R. It is assumed that the part of the shovel 100A corresponding to the partial region 901 serving as the three-dimensional marker is not moved and deformed. The partial region 901 serving as the three-dimensional marker preferably includes a characteristic shape that can be specified as compared with other regions (for example, a region whose sides are represented by straight lines). The partial region 901 serving as the three-dimensional marker includes a characteristic shape, and thus it is easy to recognize which part corresponds to the partial region of the shovel 100A which is captured in the three-dimensional image information captured by the space recognition device 40. Therefore, it is possible to improve the accuracy of specifying the position and the pose of the space recognition device 40 to be described below and to reduce the work required for a specifying process.

Thus, the control device 210 can specify which position in the partial region 901 the shape of the shovel 100A included in the three-dimensional image information captured by the space recognition devices 40F, 40B, 40L, and 40R corresponds to by referring to the three-dimensional marker stored in the three-dimensional marker storage part 251.

The control device 210 includes a communication control part 211, a specifying part 212, and a combining processing part 213. The functions of the communication control part 211, the specifying part 212, and the combining processing part 213 are achieved by, for example, loading a program stored in an auxiliary storage device onto the memory device and executing the program by the CPU.

The communication control part 211 (an example of an acquisition part) controls transmission and reception of information to and from the work machine 100 with the communication device 220. For example, the communication control part 211 receives (acquires), from the work machine 100, three-dimensional image information (an example of detected information) of each space recognition device 40 provided on the work machine 100. In this embodiment, an example in which the communication control part 211 (an example of an acquiring part) receives (acquires) three-dimensional image information (an example of detected information) of each space recognition device 40 provided on the work machine 100 will be described, but this embodiment is not limited to the example of receiving from each space recognition device 40, and three-dimensional image information (an example of detected information) may be received from one space recognition device 40.

For each space recognition device 40 in the reference coordinate system, the specifying part 212 specifies the position and the pose by performing matching between the three-dimensional shape information and the three-dimensional marker, the reference image information including the shape of a part of the work machine 100 included in each three-dimensional image information (an example of the detected information) received (acquired) by the communication control part 211, the three-dimensional marker being held in advance as the shape of the shovel 100A represented in the reference coordinate system. By specifying the position and the pose of each space recognition device 40 provided on the work machine 100, for example, it is possible to reduce the work required for the user to perform during initial settings of the work machine 100. In this embodiment, targets whose positions and poses are to be estimated are not necessarily the space recognition devices, and the position and the pose of one space recognition device 40 may be estimated. The position to be estimated is a position in the reference coordinate system. As described above, the reference coordinate system is a three-dimensional coordinate system for specifying the position of the structure of the shovel 100A indicated by the three-dimensional marker, and indicates, for example, a coordinate system in which the center position 951 on the installation surface of the shovel 100A is set as the origin, the front-rear direction of the shovel 100A is indicated as the X-axis, the widthwise direction is indicated as the Y-axis, and the height direction is indicated as the Z-axis. The position to be estimated is a position in the three dimensional space indicated in the reference coordinate system. The pose to be estimated is, for example, an angle (inclination) in the height direction (in other words, the Z-axis direction) in which the space recognition device 40 is installed in the reference coordinate system. In a case where the inclination of the space recognition device 40 is represented by the direction of the optical axis, the pose may be, for example, a pose in which the optical axis of the space recognition device 40 is inclined downward by 60 degrees.

Figure 10:
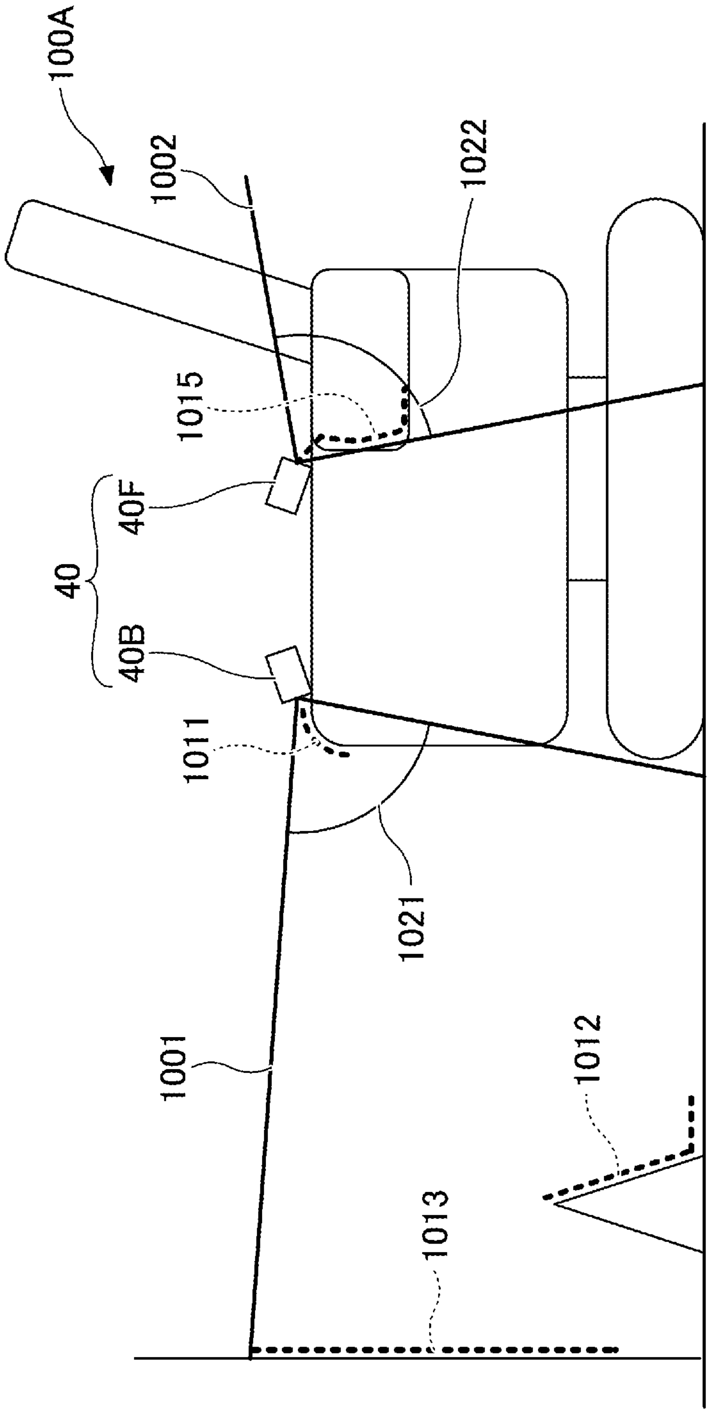
FIG. 10 is a diagram illustrating measurement ranges of space recognition devices provided in the shovel according to the embodiment.

FIG. 10 is a diagram illustrating the measurement range of the space recognition device 40. As illustrated in FIG. 10, the space recognition device 40B captures an image of a measurement range 1001 including a part 1011 which is a part of the external appearance of the shovel 100A. The space recognition device 40F captures an image of a measurement range 1002 including a part 1015 which is a part of the external appearance of the shovel 100A.

The space recognition device 40 can detect a distance to an object within the measurement range. In this embodiment, among the objects within the measurement range, an object existing in a range of 0 m to 0.5 m from the space recognition device 40 is recognized as the three-dimensional marker. The three-dimensional marker is information indicating a part of the external appearance of the shovel 100A, which is used to specify the position and the pose of the space recognition device 40. Furthermore, it is preferable that the three-dimensional marker is expressed by a characteristic shape in order to specify the position and the pose of the space recognition device 40B.

For example, the space recognition device 40B can detect a distance to an object within the measurement range 1001. The specifying part 212 recognizes, as the shape of the shovel 100A corresponding to the three-dimensional marker, the part 1011 which is a part of the external appearance of the shovel 100A detected within a marker detection range 1021 (a range within 0.5 m from the space recognition device 40B) in the measurement range 1001, based on the three-dimensional image information captured by the space recognition device 40B. The specifying part 212 also recognizes, as objects existing around the shovel 100A, regions 1012 and 1013 detected outside the marker detection range 1021.

As another example, the space recognition device 40F can detect a distance to an object within the measurement range 1002. The specifying part 212 recognizes, as the shape of the shovel 100A corresponding to the three-dimensional marker, the part 1015 which is a part of the external appearance of the shovel 100A detected in a marker detection range 1022 (a range within 0.5 m from the space recognition device 40F) in the measurement range 1002.

Figure 11:
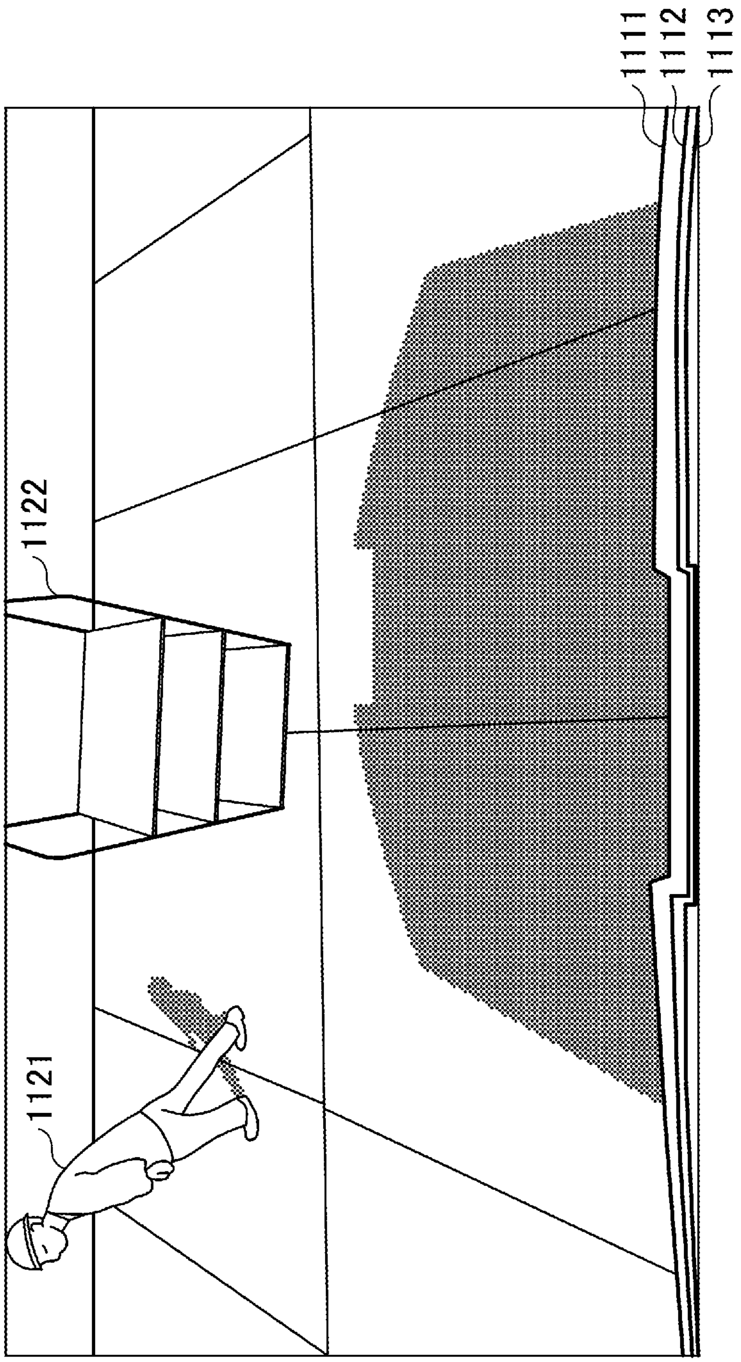
FIG. 11 is a diagram illustrating an example of three-dimensional image information captured by the space recognition device according to the embodiment.

FIG. 11 is a diagram illustrating an example of three-dimensional image information captured by the space recognition device 40B. A person 1121 and an object 1122 illustrated in FIG. 11 are recognized as objects existing around the shovel 100A, and parts 1111, 1112, and 1113 which are parts of the external appearance of the shovel 100A are recognized as the shape of the work machine 100 corresponding to the three-dimensional marker.

Figure 12:
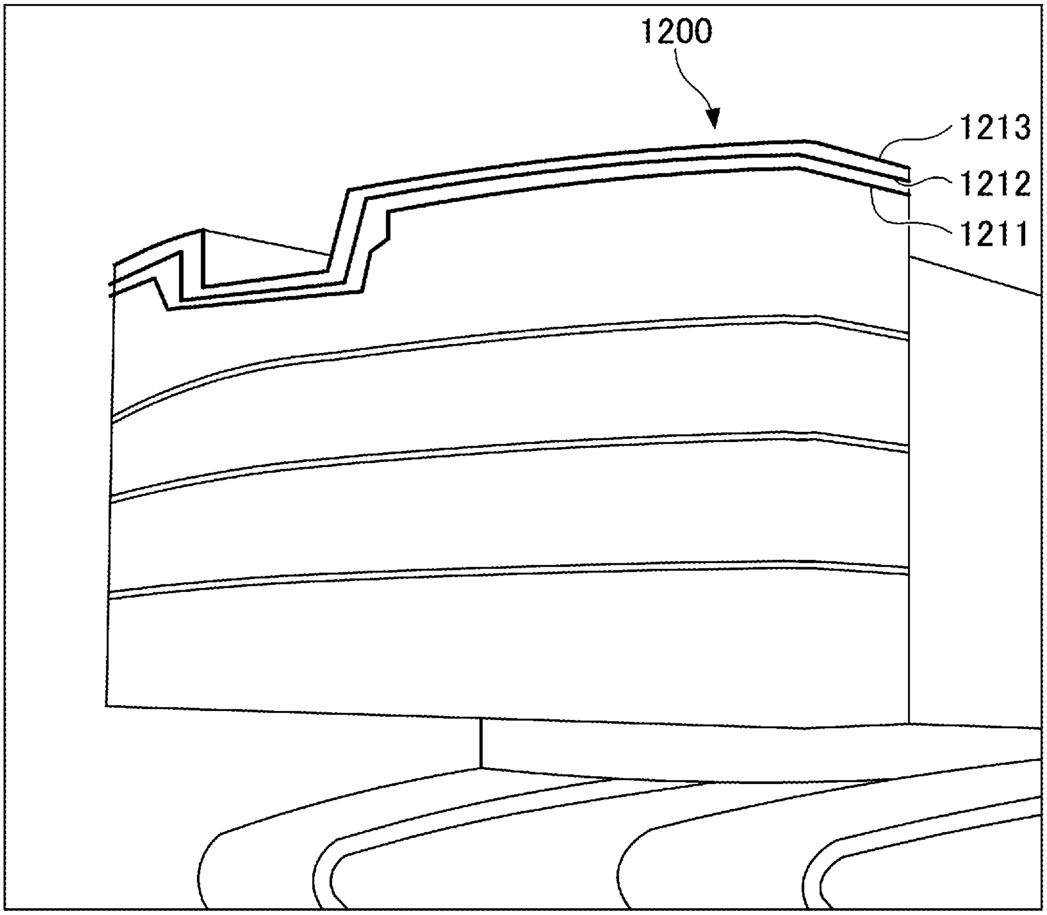
FIG. 12 is a diagram illustrating a shape of a part of a three-dimensional marker of the shovel, the shape being stored in the three-dimensional marker storage part according to the embodiment.

FIG. 12 is a diagram illustrating a part of a three-dimensional marker 1200 representing the shape of the shovel 100A, which is stored in the three-dimensional marker storage part 251. In the example illustrated in FIG. 12, information indicating the shapes of parts 1211, 1212, and 1213 which are parts of the three-dimensional marker 1200 corresponding to the parts 1111, 1112, and 1113 which are parts of the external appearance of the shovel 100A and the positions where the parts exist is stored in the three-dimensional marker storage part 251.

As illustrated in FIG. 12, the parts 1211, 1212, and 1213 which are parts of the three-dimensional marker 1200 have a recessed shape near the center. The three-dimensional marker storage part 251 according to this embodiment also holds information indicating the positions of the recessed shapes of the parts 1211, 1212, and 1213 which are parts of the three-dimensional marker 1200. Therefore, the specifying part 212 can specify where the detected range corresponds to which part of the three-dimensional marker 1200 by comparing the recessed shape in the three-dimensional image information with the recessed shape of the three-dimensional marker 1200 stored in the three-dimensional marker storage part 251.

Specifically, the specifying part 212 performs at least one of translation, rotation, or scaling on the parts 1111, 1112, and 1113 which are parts of the external appearance of the shovel 100A existing within 0.5 m in the three-dimensional image information illustrated in FIG. 11. The specifying part 212 then determines whether the parts 1111, 1112, and 1113 that are parts of the external appearance subjected to processing of at least one of translation, rotation, or scaling match parts of a three-dimensional shape model of the three-dimensional marker stored in the three-dimensional marker storage part 251.

In a case where the specifying part 212 determines that the parts 1111, 1112, and 1113 which are the parts of the external appearance of the shovel 100A match the parts 1211, 1212, and 1213 of the three-dimensional marker 1200, the specifying part 212 specifies the position and the pose of the space recognition device 40 based on the information indicating the positions of the parts 1211, 1212, and 1213 which are parts of the three-dimensional marker 1200 stored in the three-dimensional marker storage part 251 and the information indicating the relative distances to the parts 1111, 1112, and 1113 which are parts of the external appearance of the shovel 100A indicated in the three-dimensional image information.

As described above, the space recognition device 40 is provided on the upper surface of the shovel 100A. Therefore, the specifying part 212 performs matching between the parts 1211, 1212, and 1213 which are parts of the shape representing the upper surface of the shovel 100A in the three-dimensional marker 1200 and the parts 1111, 1112, and 1113 which are parts of the external appearance of the shovel 100A. By determining parts to be matched in advance in this way, a load required for performing processing can be reduced.

As specific processing for specifying the position and the pose of the space recognition device 40, for example, a random sample consensus (RANSAC) algorithm may be used. The specifying part 212 specifies the position and the pose of the space recognition device 40 in the reference coordinate system by applying the three-dimensional image information to the three-dimensional shape model of the three-dimensional marker stored in the three-dimensional marker storage part 251 with the RANSAC algorithm. In other words, the specifying part 212 searches for the position of the space recognition device 40 at which the parts 1211, 1212, and 1213 which are parts of the three-dimensional marker 1200 illustrated in FIG. 12 are displayed in the three-dimensional image information illustrated in FIG. 11. In this embodiment, the specifying part 212 uses the RANSAC algorithm in a case where at least one of processing of translation, rotation, or scaling is performed so that the parts 1111, 1112, and 1113 which are parts of the external appearance of the shovel 100A match the parts 1211, 1212, and 1213 which are parts of the three-dimensional marker 1200. Note that this embodiment is not limited to estimation using the RANSAC for matching, and estimation may be performed using another algorithm.

The specifying part 212 may also adjust the position and the pose, which are the result obtained by using the RANSAC algorithm, using an iterative closest point (ICP) as one of methods for registration. By using this method, it is possible to suppress an error and improve the accuracy of specifying the position and pose.

The specifying part 212 stores information indicating the specified position and pose of the space recognition device 40 in the position information storage part 252. In a case where the three-dimensional image information is transmitted from the work machine 100 after the information indicating the position and the pose of the space recognition device 40 is stored, in other words, in a case where the three-dimensional image information is transmitted after the specification of the position and the pose is completed, it is possible to suppress processing of specifying the position and the pose of the space recognition device 40 by the specifying part 212.

The specifying part 212 may specify the position and the pose of the space recognition device 40 at any timing. For example, the specifying part 212 may specify the position and the pose of the space recognition device 40 when the user finely adjusts the position and the pose of the space recognition device 40. As described above, if the three-dimensional marker, in other words, a part of the characteristic shape of the work machine 100 is captured in the three-dimensional image information from the space recognition device 40, the specifying part 212 can specify the information indicating the position and the pose of the space recognition device 40 by the above-described processing.

The space recognition device 40 may include a movable part. Even when the user changes the position or the pose of the space recognition device 40 by adjusting the movable part, the position and the pose of the space recognition device 40 can be continuously specified by the above-described processing, in other words, due to the characteristic shape of the work machine 100 included in the three-dimensional image information. A range of movement of the movable part may be limited. For example, it is conceivable to limit the range of movement such that the characteristic shape of the work machine 100 serving as the three-dimensional marker can be captured. The movable part provided in the space recognition device 40 is not limited to a mechanism that can be moved by adjusting by the user or the like, and may include a driving mechanism for rotation or the like.

That is, in a case where the space recognition device 40 has the movable part, the space recognition device 40 is arranged such that the detected part of the work machine 100 is included in the measurement range of the space recognition device 40 after the space recognition device 40 is adjusted by the user or the like or moved by the driving mechanism. Accordingly, the specifying part 212 can specify the position and the pose of the space recognition device 40 based on the shape of the part of the work machine 100 included in the three-dimensional image information acquired from the space recognition device 40. The position of the space recognition device 40 after the adjustment by the operator or the like or the movement by the driving mechanism may be a position structurally predetermined by restriction of the movable range of the space recognition device 40 or may be a position set in advance according to an instruction manual or the like when the operator or the like performs the adjustment. Even when the space recognition device 40 is movable by the movable part in this way, the position and the pose of the space recognition device 40 can be specified. Therefore, the same effect as in a case where the space recognition device 40 is fixed can be obtained.

When receiving the three-dimensional image information of the work machine 100 or each space recognition device 40, the combining processing part 213 combines the three-dimensional image information of each space recognition device 40 with the reference coordinate system according to the position and the pose of the corresponding space recognition device 40 specified by the specifying part 212. The combining processing part 213 then generates three-dimensional combined image information representing the periphery of the work machine 100.

Figure 13:
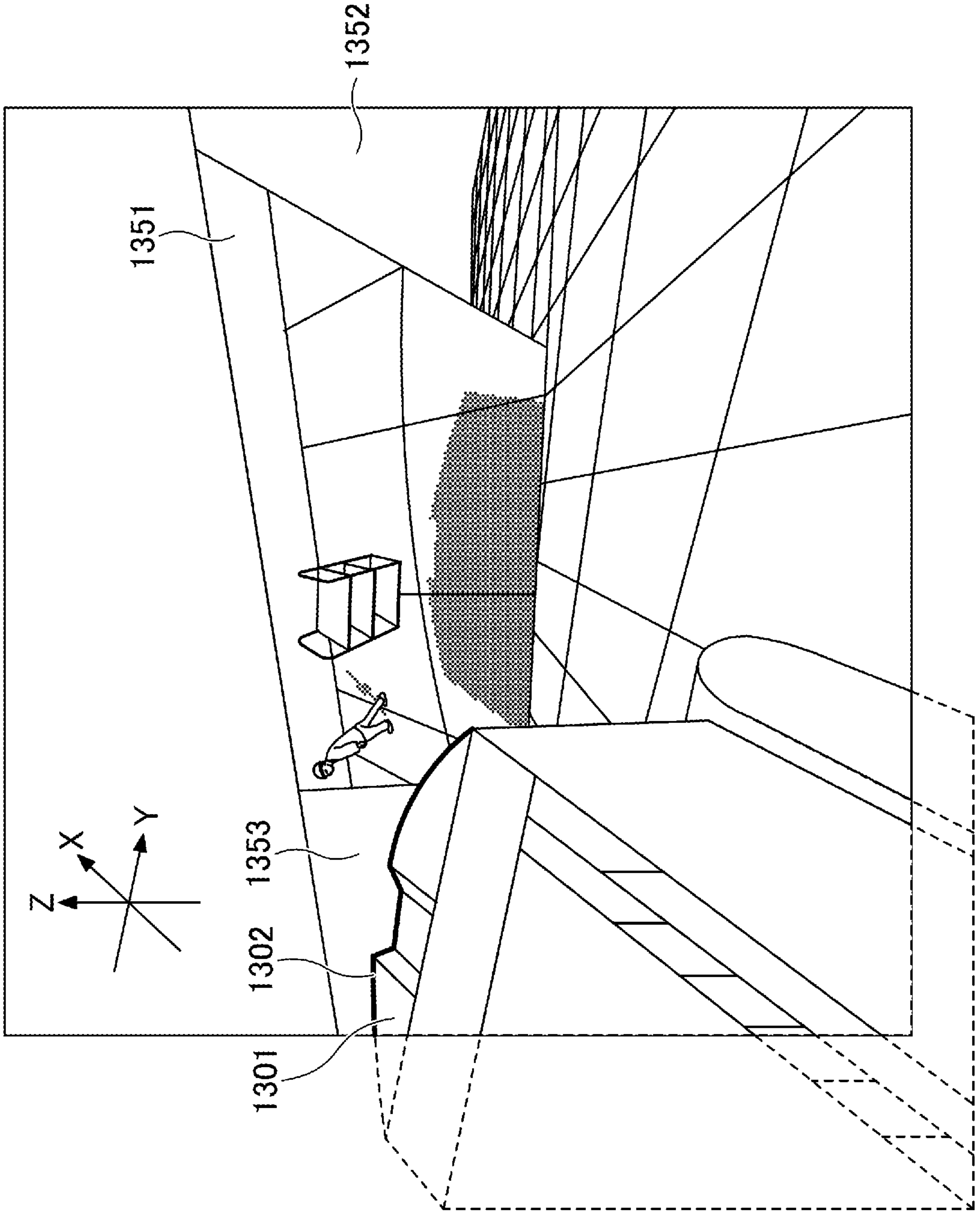
FIG. 13 is a diagram illustrating a part of three-dimensional combined image information generated by a combining processing part according to the embodiment.

FIG. 13 is a diagram illustrating a part of the three-dimensional combined image information generated by the combining processing part 213. In the example illustrated in FIG. 13, a three-dimensional model 1301 representing the shovel 100A is arranged near the center position of the reference coordinate system, and three-dimensional image information 1351 illustrated in FIG. 11 is arranged in the three dimensional space based on the position and pose of the space recognition device 40B that has captured the three-dimensional image information. Note that a part 1302 of the three-dimensional model 1301 corresponds to a part of the external appearance of the shovel 100A detected by the space recognition device 40.

Although omitted in FIG. 13, the three-dimensional image information captured by the space recognition device 40L is arranged in a region 1352, and the three-dimensional image information captured by the space recognition device 40R is arranged in a region 1353.

The three-dimensional combined image information illustrated in FIG. 13 is obtained by combining the three-dimensional image information from each space recognition device 40 provided on the shovel 100A in the three dimensional space. In this embodiment, by performing predetermined image processing, two-dimensional image information in which the periphery of the work machine 100 is viewed from an arbitrary viewpoint can be generated from the three-dimensional combined image information.

The image information based on the three-dimensional combined image information may be transmitted to the shovel 100A by the communication control part 211.

The display control part 302 of the shovel 100A performs predetermined image processing on the three-dimensional combined image information to generate two-dimensional image information by viewing the periphery of the work machine 100 from an arbitrary viewpoint, and displays the image information generated. The operator of the shovel 100A can recognize the situation around the shovel 100A by referring to the image information based on the three-dimensional combined image information. Accordingly, in this embodiment, by using the three-dimensional combined image information for display, the situation around the work machine 100 can be seamlessly displayed. This makes it easy for the operator to ascertain the peripheral state.

In this embodiment, the case of the shovel 100A has been described with reference to FIG. 9 to FIG. 13; however, the work machine 100 may be a work machine other than the shovel 100A. The crawler crane 100B will now be described.

Figure 14:
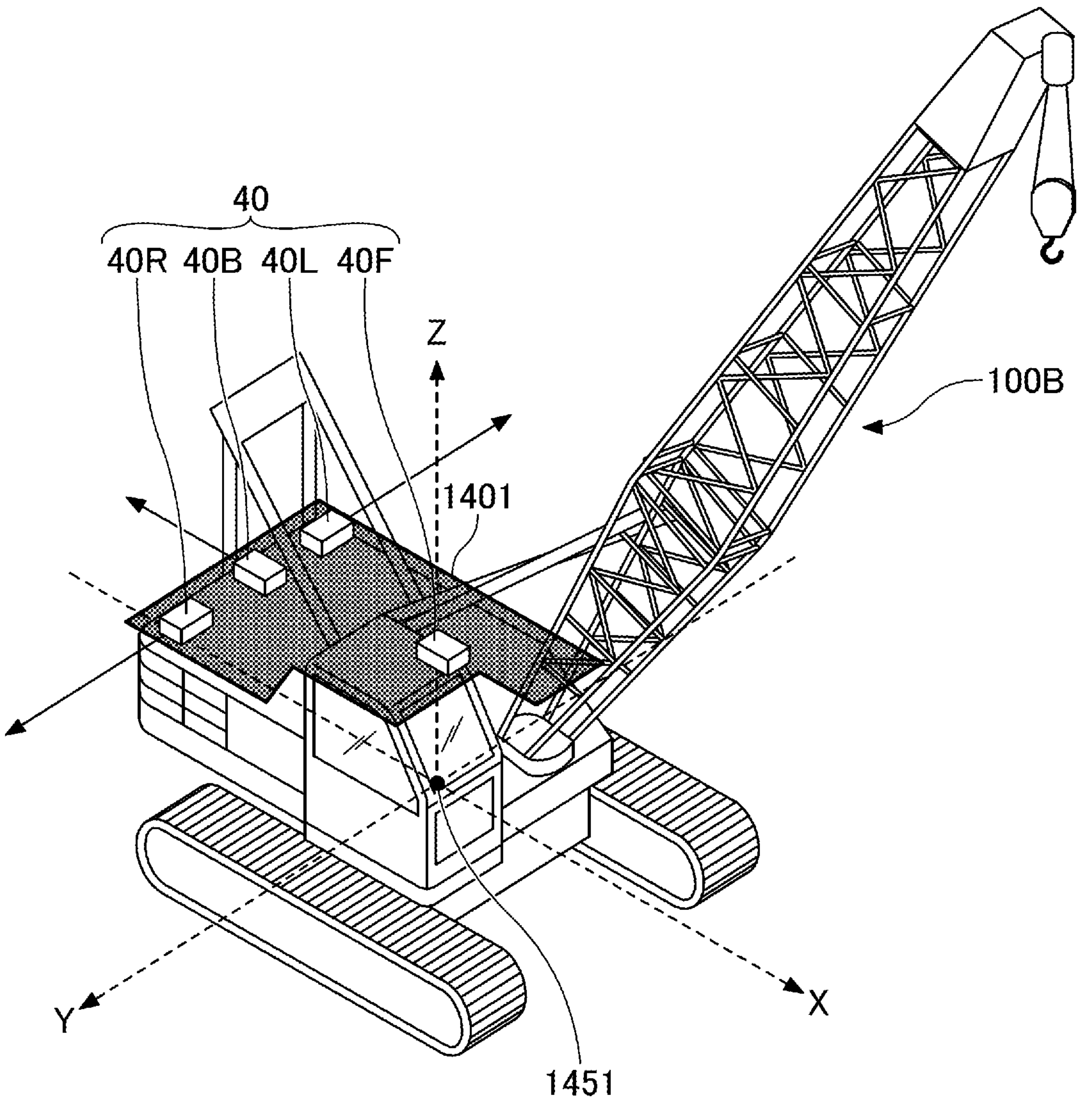
FIG. 14 is a conceptual diagram illustrating a three-dimensional marker stored in the three-dimensional marker storage part according to the embodiment.

FIG. 14 is a conceptual diagram illustrating the three-dimensional marker stored in the three-dimensional marker storage part 251 according to this embodiment. FIG. 14 illustrates a partial region 1401 of the crawler crane 100B that serves as a three-dimensional marker. The three-dimensional marker of the partial region 1401 is illustrated in the reference coordinate system. The reference coordinate system is a three-dimensional coordinate system for specifying the position of the structure of the crawler crane 100B indicated by the three-dimensional marker, and indicates a coordinate system in which the front-rear direction of the crawler crane 100B is set as the X-axis, the widthwise direction is set as the Y-axis, and the height direction is set as the Z-axis. The reference coordinate system illustrated in FIG. 14 is, for example, a coordinate system in which a center position 1451 on an installation surface of the crawler crane 100B is set as the origin, but this is illustrated as an example, and another position may be the origin.

In the example illustrated in FIG. 14, a three-dimensional marker indicating the shape and the position of the partial region 1401 which is a part of the external appearance of the crawler crane 100B is stored in the three-dimensional marker storage part 251. The three-dimensional marker may be generated a result of detection performed by the space recognition device 40, for example.

The partial region 1401 includes the shape of the crawler crane 100B included in the measurement range of the space recognition devices 40F, 40B, 40L, and 40R. Furthermore, it is assumed that the part of the crawler crane 100B corresponding to the partial region 1401 serving as the three-dimensional marker is not moved and deformed.

Thus, the control device 210 can specify which position in the partial region 1401 the shape of the crawler crane 100B included in the three-dimensional image information captured by the space recognition devices 40F, 40B, 40L, and 40R corresponds to by referring to the three-dimensional marker stored in the three-dimensional marker storage part 251.

As described above, in the crawler crane 100B, the number of weights stacked on as the counterweight 9B varies depending on the site. The space recognition device 40 is installed on the upper surface of the counterweight 9B. That is, the position and pose of the space recognition device 40 to be mounted are different depending on the site.

Therefore, the three-dimensional marker storage part 251 stores three-dimensional markers for each number of weights that can be stacked as the counterweight 9B. In other words, in this embodiment, the three-dimensional marker storage part 251 stores three-dimensional markers corresponding to the site.

Figure 15:
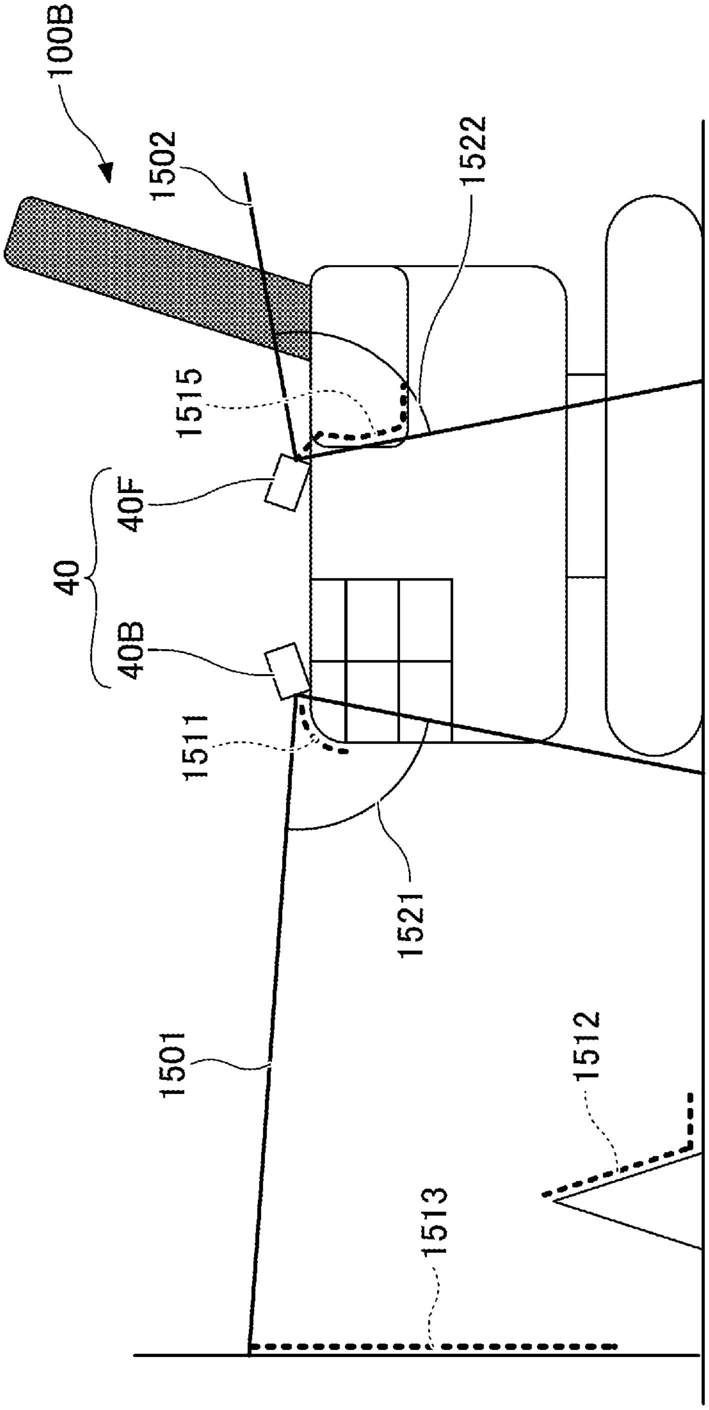
FIG. 15 is a diagram illustrating measurement ranges of space recognition devices provided in the crawler crane according to the embodiment.

FIG. 15 is a diagram illustrating the measurement ranges of the space recognition device 40. As illustrated in FIG. 15, the space recognition device 40B captures an image of a measurement range 1501 including a part 1511 which is a part of the external appearance of the crawler crane 100B. The space recognition device 40F captures an image of a measurement range 1502 including a part 1515 which is a part of the external appearance of the crawler crane 100B.

For example, the space recognition device 40B can detect a distance to an object within the measurement range 1501. The specifying part 212 recognizes, as the shape of the crawler crane 100B corresponding to the three-dimensional marker, the part 1511 which is a part of the external appearance of the crawler crane 100B detected within a marker detection range 1521 (a range within 0.5 m from the space recognition device 40B) in the measurement range 1501, based on the three-dimensional image information captured by the space recognition device 40B. The specifying part 212 also recognizes, as objects existing around the crawler crane 100B, regions 1512 and 1513 detected outside the marker detection range 1521.

As another example, the space recognition device 40F can detect a distance to an object within the measurement range 1502. The specifying part 212 recognizes, as the shape of the crawler crane 100B corresponding to the three-dimensional marker, the part 1515 which is a part of the external appearance of the crawler crane 100B detected in a marker detection range 1522 (a range within 0.5 m from the space recognition device 40F) in the measurement range 1502.

The specifying part 212 performs at least one of translation, rotation, or scaling on the part of the external appearance of the crawler crane 100B existing within 0.5 m in the three-dimensional image information captured by the space recognition device 40. The specifying part 212 then determines whether the part of the external appearance subjected to processing of at least one of translation, rotation, or scaling matches a part of a three-dimensional shape model of the three-dimensional marker corresponding to the current site stored in the three-dimensional marker storage part 251.

Note that, in this embodiment, an example in which three-dimensional markers (the number of which varies depending on the number of the weights used as the counterweight 9B) of the crawler crane 100B are stored is described. In such a case, the selection of the three-dimensional marker corresponding to the current site from among the three-dimensional markers may be performed by using a predetermined method. For example, the user may select a three-dimensional marker corresponding to the current site, or a three-dimensional marker may be automatically selected.

The subsequent processing is the same as that of the shovel 100A described above, and thus the description thereof will be omitted.

Figure 16:
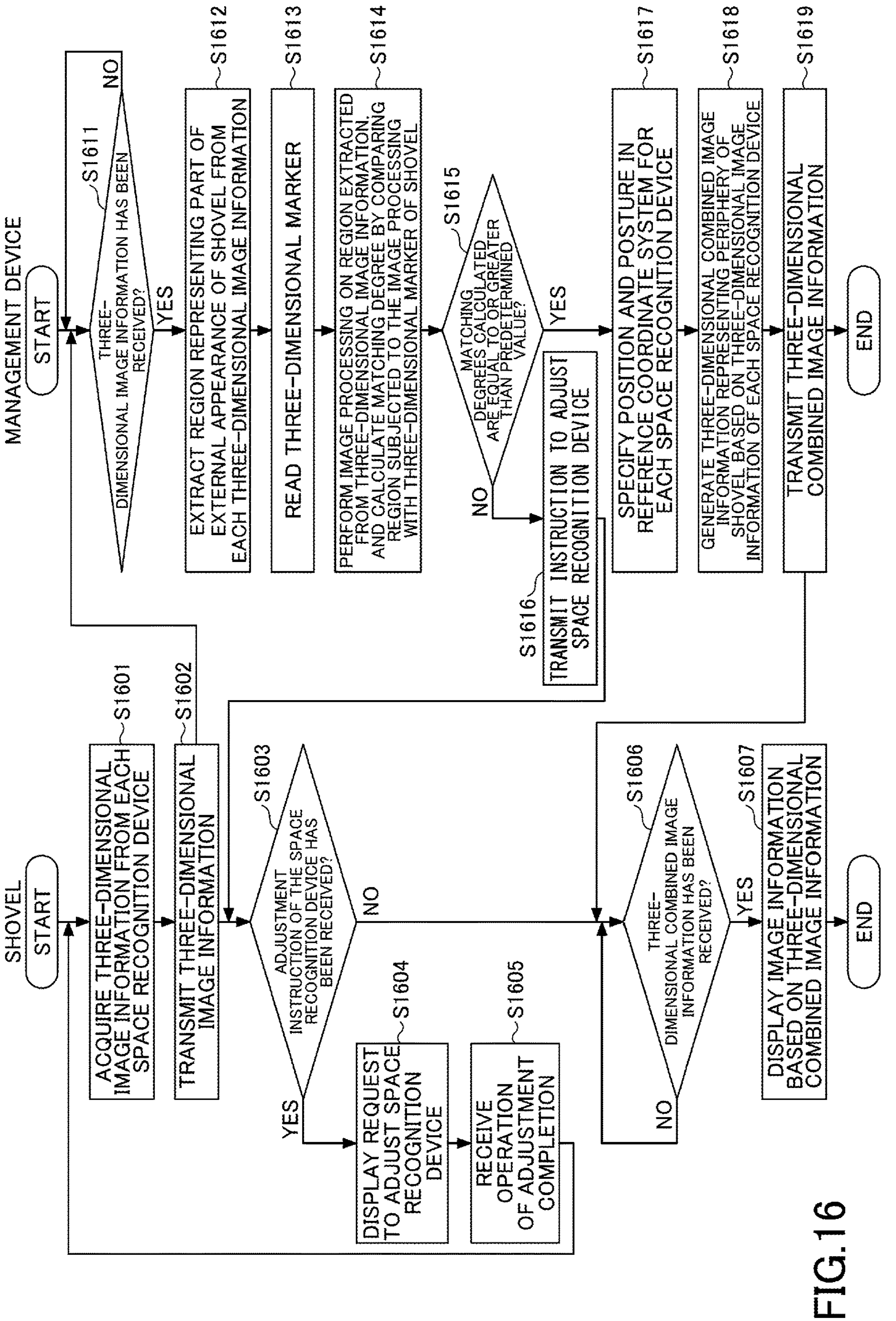
FIG. 16 is a flowchart illustrating overall processing in the peripheral monitoring system according to the embodiment.

A flow of processing of the peripheral monitoring system SYS will now be described. FIG. 16 is a flowchart illustrating overall processing in the peripheral monitoring system SYS. Although FIG. 16 illustrates the case of the shovel 100A, the same applies to the case of the crawler crane 100B.

The controller 30 of the shovel 100A acquires the three-dimensional image information from each space recognition device 40 (S1601).

The communication control part 301 of the shovel 100A transmits the acquired three-dimensional image information to the management device 200 (S1602).

The communication control part 211 of the management device 200 determines whether or not the three-dimensional image information has been received (acquired) (S1611: acquisition step). If it is determined that the information has not been received (S1611: No), the determination of S1611 is performed again.

When the communication control part 211 of the management device 200 determines that the three-dimensional image information has been received (S1611: Yes), the specifying part 212 extracts a region (for example, a region of an object detected as being present within 0.5 m from the space recognition device 40) representing a part of the external appearance of the shovel 100A from each piece of the three-dimensional image information (S1612).

The specifying part 212 reads the three-dimensional marker representing the shovel 100A from the three-dimensional marker storage part 251 (S1613).

The specifying part 212 performs translation, rotation, and scaling processing (image processing) on the region representing a part of the external appearance of the shovel 100A extracted from the three-dimensional image information, and calculates the highest matching degree by comparing the region subjected to the image processing with a part of the three-dimensional shape model of the three-dimensional marker (S1614). The matching degree is a numerical value indicating a degree of matching between the part of the external appearance of the shovel 100A and the part of the three-dimensional shape model of the three-dimensional marker, and represented in a numerical value between, for example, 0 to 1.0. The higher the numerical value is, the higher the matching degree is.

The specifying part 212 determines whether all the matching degrees calculated for each three-dimensional image information are equal to or greater than a predetermined value (S1615). The predetermined value is an example of a predetermined threshold value determined as a determination criterion of the matching degree according to an embodiment.

When it is determined that the matching degree is not equal to or greater than the predetermined value (in other words, the matching degree is lower than the predetermined value) (S1615: No), the communication control part 211 transmits an instruction to adjust the space recognition device 40 to the shovel 100A through the communication device 220 (S1616). That is, when the matching degree is not equal to or greater than the predetermined value, it is considered that the part of the external appearance of the shovel 100A has not been captured in the measurement range of the space recognition device 40, and the communication control part 211 transmits a request to adjust the position or the pose of the space recognition device 40 such that the part of the external appearance of the shovel 100A can be captured. The adjustment instruction according to this embodiment is, for example, information for requesting adjustment of the position or the pose of the space recognition device 40 that has output the three-dimensional image information (an example of detected information), but may be any notification as long as the notification is related to the space recognition device 40 to be adjusted.

The communication control part 301 of the shovel 100A determines whether or not the adjustment instruction of the space recognition device 40 has been received (S1603). In a case where the adjustment instruction has been received (S1603: Yes), the display control part 302 displays a request to adjust the space recognition device 40 on the output device 50 (display device) (S1604). When the request is displayed, the operator of the shovel 100A adjusts the position and the pose of the space recognition device 40. Since the operator or the like can adjust the position and pose of the space recognition device 40, it is possible to improve the efficiency of work based on the information detected by the space recognition device 40.

The controller 30 of the shovel 100A then receives an operation of completion of adjustment of the position and the pose from the operator (S1605). When the operation is received, the processing is re-started from S1601.

In S1615, when the specifying part 212 of the management device 200 determines that all the matching degrees calculated for each piece of three-dimensional image information are equal to or greater than the predetermined value (S1615: Yes), the specifying part 212 then specifies the position and the pose in the reference coordinate system for each space recognition device 40 (S1617: specification step). The specifying part 212 stores the specified position and pose in the position information storage part 252.

The combining processing part 213 then combines the three-dimensional image information of each space recognition device 40 with the reference coordinate system according to the position and the pose of the corresponding space recognition device 40 specified by the specifying part 212, and generates three-dimensional combined image information representing the periphery of the shovel 100A (S1618).

The communication control part 211 then transmits the three-dimensional combined image information to the shovel 100A through the communication device 220 (S1619).

The communication control part 301 of the shovel 100A determines whether or not the three-dimensional combined image information has been received (S1606). If the three-dimensional combined image information has not been received (S1606: NO), the processing of 1601 is repeated until the three-dimensional combined image information is received.

When the communication control part 301 of the shovel 100A determines that the three-dimensional combined image information has been received (S1606: YES), the display control part 302 displays image information based on the three-dimensional combined image information (S1607), and the process is ended.

In the processing procedure described above, the processing for displaying the three-dimensional combined image information on the shovel 100A has been described. However, the display of the three-dimensional combined image information is not limited to the work machine 100. As described above, in the peripheral monitoring system SYS, the management device 200 may support the remote operation of the work machine 100. Therefore, in a case where the management device 200 performs the remote control of the work machine 100, the control device 210 may display image information based on the generated three-dimensional combined image information on the output device 240. Thus, in the management device 200, the operator can perform the remote control while referring to the image information based on the three-dimensional combined image information and checking the situation around the work machine 100.

Figure 17:
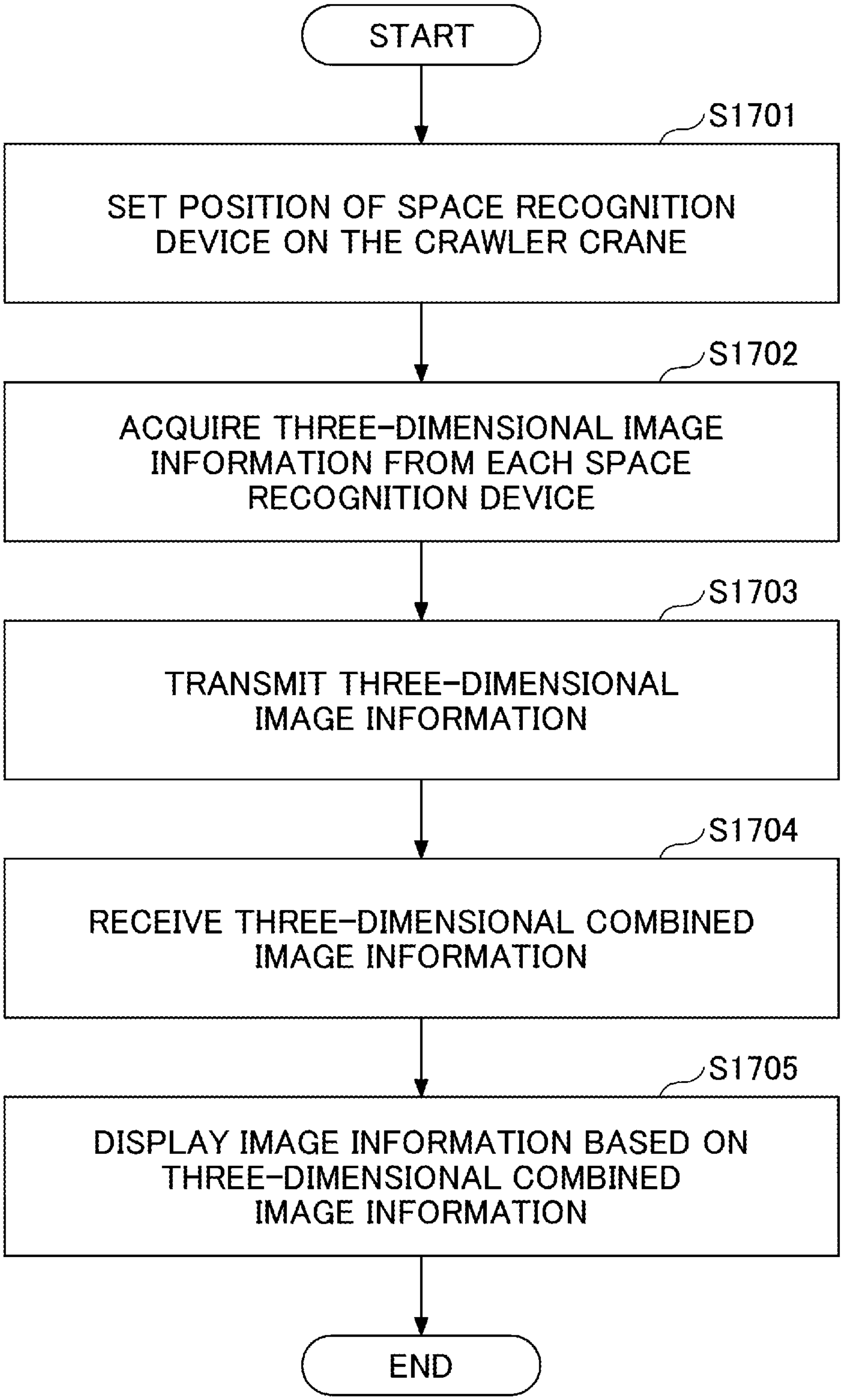
FIG. 17 is a flowchart illustrating processing at the time of assembling the crawler crane according to the embodiment.

A flow of the crawler crane 100B at the time of assembly will now be described. FIG. 17 is a flowchart illustrating processing at the time of assembling the crawler crane 100B. Although FIG. 17 illustrates the case of the crawler crane 100B, the present disclosure can be applied to a situation in which the work machine 100 is assembled on site.

In a case where the operator or the work machine assembles the crawler crane 100B at the site where the work is performed, the space recognition device 40 is mounted at a position on the crawler crane 100B such that a part of the crawler crane 100B is included in a target range of detection of the space recognition device 40 (S1701: an example of an installation step). For example, the space recognition device 40 is a mechanism connected to the crawler crane 100B, and has a structure in which the installation position thereof can be changed such that it can be set on the upper surface of the counterweight 9B whose height changes depending on the site. For example, the space recognition device 40 may have a mechanism in which a portion connected to the main body of the crawler crane 100B is extendable and contractible. The number of the space recognition devices 40 mounted on the crawler crane 100B is, for example, four as described above; however, the number of the space recognition devices 40 mounted is not limited thereto, and may be three, five or more. As described above, in the case of the crawler crane 100B, the direction to which the imaging is desired to be performed changes depending on the customer or the site, and thus the space recognition device 40 is configured to be movable. Even when the space recognition device 40 is moved, a part of the crawler crane 100B is required to be included in the measurement range. In order to be included in the measurement range, for example, the movement of the space recognition device 40 may be restricted by the above-described extendable and contractible mechanism. The restriction for setting the space recognition device 40 may be provided in writing in an instruction manual or the like.

After the installation, the controller 30 acquires three-dimensional image information obtained by performing imaging from the positions where each space recognition device 40 is installed (S1702).

The communication control part 211 of the crawler crane 100B transmits the generated three-dimensional image information to the management device 200 (an example of an information processing device) through the communication device 220 (S1703: an example of a transmission step).

Accordingly, the specifying part 212 of the management device 200 specifies the position and the pose of the space recognition device 40 that has captured the three-dimensional image information, based on each of the received three-dimensional image information and the part of the three-dimensional marker representing the shape of the crawler crane 100B assembled at the current site. The method described above is used as the method for specification, and the description thereof will be omitted. The combining processing part 213 of the management device 200 may generate three-dimensional combined image information by combining the three-dimensional image information based on the specified position and pose.

The communication control part 211 of the crawler crane 100B then receives the three-dimensional combined image information from the management device 200 (an example of an information processing device) through the communication device 220 (S1704: an example of a reception step). Note that, in this flowchart, an example of receiving the three-dimensional combined image information has been described; however, the received information is not limited to the three-dimensional combined image information, and may be information processed based on the three-dimensional image information and the part of the three-dimensional marker representing the shape of the crawler crane 100B. Information indicating the position and pose of the space recognition device 40 may be received, for example.

When the communication control part 211 of the crawler crane 100B has received the three-dimensional combined image information, the display control part 302 displays the image information based on the three-dimensional combined image information (S1705).

In the above-described processing procedure, the space recognition device 40 is mounted according to the crawler crane 100B of the site, and the periphery of the crawler crane 100B can be monitored according to the result of detection of the space recognition device 40. It is not therefore necessary to set the position and pose of the space recognition device 40 for each site, and thus it is possible to reduce a load of work.

[Example Application of Peripheral Monitoring System to Continuous Unloader]

The peripheral monitoring system SYS according to the above-described embodiment has been described with examples in which the shovel 100A and the crawler crane 100B are managed as the work machine 100. However, the above-described embodiment does not limit the work machine 100 to the shovel 100A and the crawler crane 100B.

A case where the work machine 100 to be monitored by the peripheral monitoring system SYS is a continuous unloader 100C will be described with reference to FIG. 18 and FIG. 19.

<Configuration of Continuous Unloader>

Figure 18:
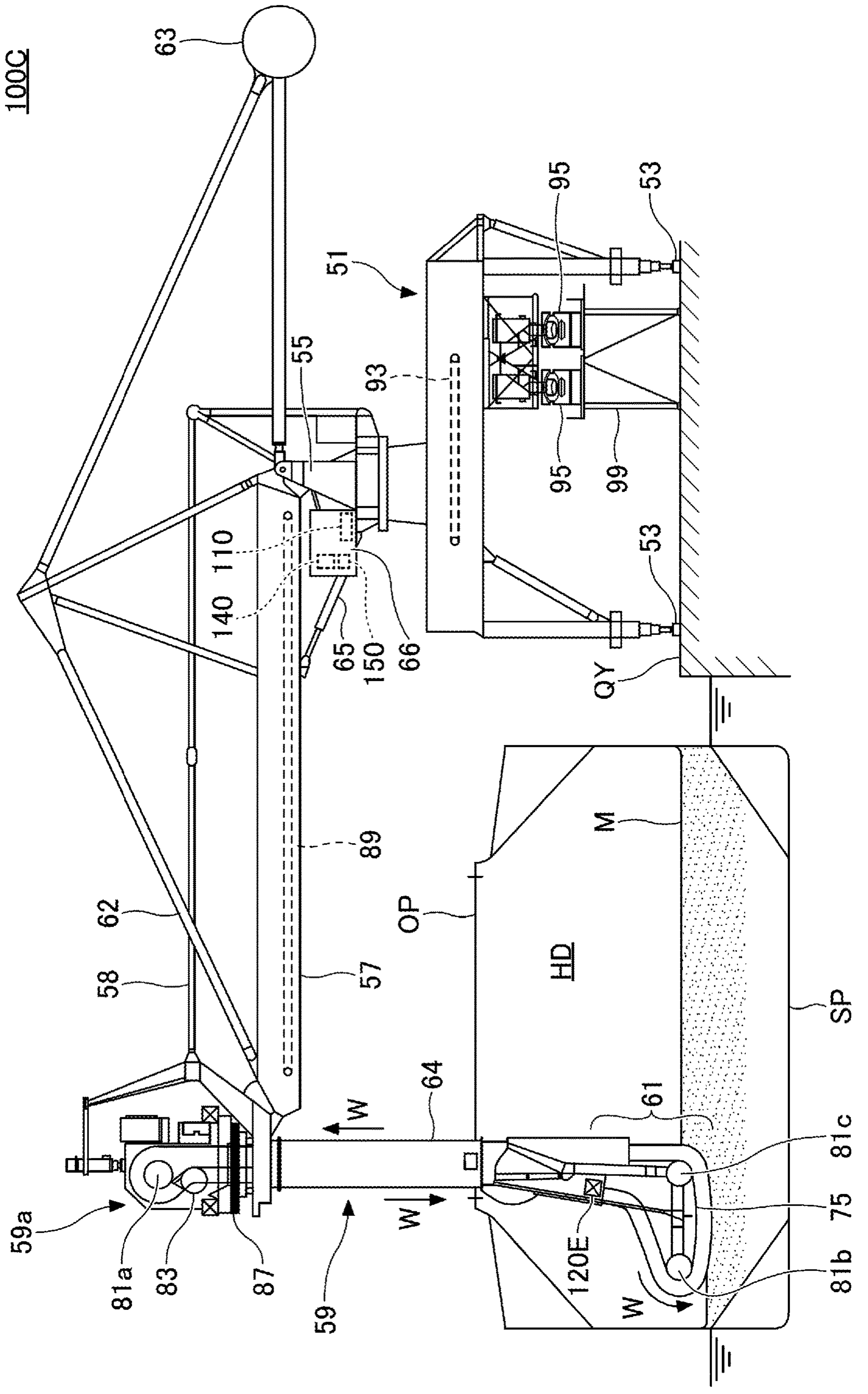
FIG. 18 is an overall view illustrating an example of a continuous unloader according to the embodiment.
Figure 19:
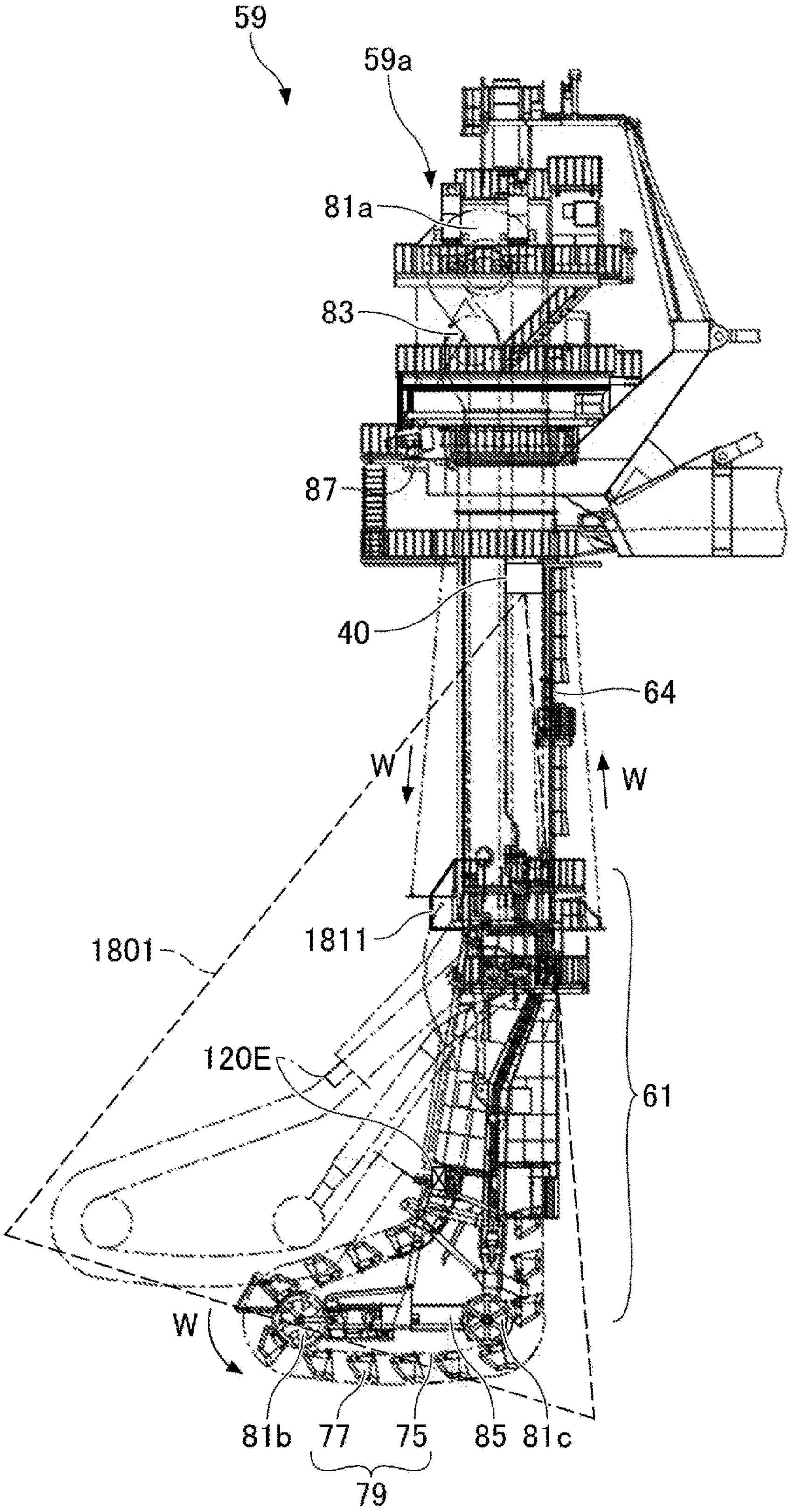
FIG. 19 is a side view of a bucket elevator of the continuous unloader according to the embodiment.

FIG. 18 and FIG. 19 are diagrams illustrating an example of an example application to the continuous unloader 100C to which the peripheral monitoring system SYS is applied. Specifically, FIG. 18 is an overall view illustrating an example of the continuous unloader 100C. FIG. 19 is a diagram illustrating a side view of a bucket elevator 59.

As illustrated in FIG. 18, the continuous unloader 100C (an example of a work machine) is what is known as a bucket elevator type, provided on a quay QY, and continuously unloads (lifts) bulk cargo M in a ship hold HD of a vessel SP berthed to the quay QY onto the ground. The bulk cargo M is, for example, coal, coke, iron ore, or the like.

The quay QY is constructed of, for example, reinforced concrete, and two rails 53 are installed on the quay QY in parallel with the extending direction thereof, that is, the longitudinal direction of the vessel SP to be berthed. The continuous unloader 100C is configured to be movable on the two rails 53, and unloading from the vessel SP is performed in a state where the continuous unloader 100C is stopped at a predetermined position.

The continuous unloader 100C includes a traveling part 51, a swing frame 55, a boom 57, the bucket elevator 59, and an operation room 66.

The traveling part 51 is configured to be movable on the two rails 53 of the quay QY.

The swing frame 55 is swingably mounted on the traveling part 51.

The boom 57 is provided so as to extend forward from the swing frame 55 toward the sea area where the vessel SP is berthed to the quay QY, and is configured to be able to be raised and lowered with respect to the swing frame 55. Specifically, the boom 57 can be raised and lowered in the vertical direction in accordance with expansion and contraction of a cylinder 65 provided between the boom 57 and the swing frame 55.

The bucket elevator 59 is provided at the distal end of the boom 57 so as to extend downward, that is, toward the vessel SP (ship hold HD). As illustrated in FIG. 18, the bucket elevator 59 has a digging part 61 at its front end portion, and the bulk cargo M dug by the digging part 61 is conveyed upward by buckets 77 to unload onto the ground.

As illustrated in FIG. 19, the digging part 61 can change its inclination angle in the front-rear direction to an elevator body 64. For example, when the bulk cargo M right below an opening OP of the ship hold HD is dug, the digging part 61 is used in a state where there is no inclination in the substantially front-rear direction relative to the elevator body 64 (a state represented by a solid line in the drawing). On the other hand, when the bulk cargo M on the inner wall side which is closer to the wall than the region right below the opening OP of the ship hold HD is dug, the digging part 61 is used in a state of being inclined forward relative to the elevator body 64 (a state represented by a dash-dot line in the drawing).

A parallel link 58 is provided between the swing frame 55 and the bucket elevator 59, and the bucket elevator 59 is configured to be able to retain a vertical state due to the mechanism of the parallel link 58 regardless of the derricking angle of the boom 57. The bucket elevator 59 can move in the vertical direction in accordance with the vertical rise and lower of the boom 57. Furthermore, a counterweight 63 is supported on the swing frame 55 through a link extending rearward on the opposite side to the boom 57, and a balancing lever 62 is provided so as to connect the counterweight 63 and the boom 57. This allows the load balance to be achieved between the bucket elevator 59 and the counterweight 63.

The operation room 66 is provided in the front area of the swing frame 55 (that is, an area in a direction to which the boom 57 extends), and is used for an operator to board and perform an operation of the continuous unloader 100C.

For example, a control device 110 is mounted in the operation room 66. A display device 140 and an input device 150 are provided in the operation room 66.

When the unloading work of the bulk cargo M by the continuous unloader 100C is performed, in addition to the operator being in the operation room 66, a worker who informs the operator of the status of the bulk cargo is arranged in the ship hold HD. The unloading work of the bulk cargo M by the continuous unloader 100C is then performed in cooperation with the operator in the operation room 66 and the worker in the ship hold HD.

The operator in the operation room 66 can operate the continuous unloader 100C while checking image information indicating the opening OP of the ship hold HD and the internal situation thereof, and contents of communication regarding the situation of the ship hold HD notified by the worker, which are displayed on the display device 140.

As illustrated in FIG. 19, the bucket elevator 59 includes the elevator body 64 provided so as to extend in the vertical direction, and a chain bucket 79 that circulates between an upper portion 59*a* and a lower portion (digging part 61) of the bucket elevator 59.

The chain bucket 79 includes a pair of roller chains 75 and the buckets 77 supported by the pair of roller chains 75 so as to be suspended therefrom.

Both ends of a roller chain 75 are connected to each other such that the chain passes through the inside of the elevator body 64 and circulates between the upper portion 59*a* and the lower portion (digging part 61) of the bucket elevator 59.

The bucket elevator 59 includes a drive roller 81*a* around which the roller chain 75 is wound, driven rollers 81*b* and 81*c* that guide the roller chain 75, and a turning roller 83.

The drive roller 81*a* is provided on the upper portion 59*a* of the bucket elevator 59, and the driven rollers 81*b* and 81*c* are provided at a predetermined interval in the front-rear direction in the digging part 61.

The turning roller 83 is arranged below the drive roller 81*a* on the upper portion 59*a* of the bucket elevator 59, and is configured to be able to change the traveling direction of the roller chain 75.

A cylinder 85 is connected between the driven rollers 81*b* and 81*c*, and the distances between the axes of the driven rollers 81*b* and 81*c* are changed in accordance with the expansion and contraction of the cylinder 85, and as a result, the track of circulation of the chain bucket 79 is changed.

The roller chain 75 is driven by the drive roller 81*a* and circulates in the direction of an arrow W with respect to the elevator body 64. The chain bucket 79 circulates between the upper portion 59*a* of the bucket elevator 59 and the digging part 61.

In the digging part 61, the bucket 77 scoops the bulk cargo M from the opening thereof to the inside thereof while the roller chain 75 moves in the substantially horizontal direction from the driven roller 81*b* toward the driven roller 81*c*. The bucket 77 that has dug and accommodated the bulk cargo M is raised in a state such that its opening faces upward in accordance with the rise of the roller chain 75 from the driven roller 81*c* toward the drive roller 81*a*. The opening of the bucket 77 that has arrived at the upper portion 59*a* of the bucket elevator 59 is turned downward as the roller chain 75 passes through the drive roller 81*a* and its traveling direction is changed from upward to downward. The bulk cargo M in the bucket 77 is sent to a rotary feeder 87 provided on the outer periphery of the bucket elevator 59 through a discharge chute.

The rotary feeder 87 conveys the bulk cargo M sent from the bucket 77 through the discharge chute to a boom conveyor 89 provided on the boom 57.

The boom conveyor 89 is provided inside the boom 57. The bulk cargo M is transferred from the rotary feeder 87 of the bucket elevator 59 to the boom conveyor 89 to convey toward the swing frame 55. A hopper is provided at an end of the boom conveyor 89 on the swing frame 55 side, and the bulk cargo M conveyed through the boom conveyor 89 is supplied to a belt conveyor 93 through the hopper.

The belt conveyor 93 is provided on the traveling part 51. The belt conveyor 93 conveys the bulk cargo M to a ground belt conveyor 95. Thus, the bulk cargo M is carried out to a ground facility 99 through the ground belt conveyor 95.

As illustrated in FIG. 19, the continuous unloader 100C includes the space recognition devices 40 and a peripheral monitoring sensor 120E.

The space recognition devices 40 are provided at equal intervals in the circumferential direction on the outer peripheral surface placed lower than the upper portion 59*a* of the bucket elevator 59. The number of the space recognition devices 40 is not limited; however, it is conceivable to provide four space recognition devices 40, for example. The four space recognition devices 40 are arranged such that the optical axes thereof are directed downward and an image of the opening OP of the ship hold HD of the vessel SP can be captured from above.

The peripheral monitoring sensor 120E is an imaging device. The peripheral monitoring sensor 120E is provided on each of the left and right outer side surfaces of the fixed portion of the lower portion (digging part 61) of the bucket elevator 59. The optical axis of the peripheral monitoring sensor 120E is directed downward, and the peripheral monitoring sensor 120E is arranged so as to be able to capture an image of the inside of the ship hold HD (that is, the upper region of the bulk cargo M) from above.

The space recognition device 40 and the peripheral monitoring sensor 120E output three-dimensional image information at predetermined intervals (for example, 1/30 seconds), for example, in a period of time from the start to the stop of the continuous unloader 100C. The captured images (including the three-dimensional image information) captured by the space recognition device 40 and the peripheral monitoring sensor 120E are loaded into the control device 110. The control device 110 has the same functions as those of the controller 30 described above.

In addition to the space recognition device 40 and the peripheral monitoring sensor 120E, another type of peripheral monitoring sensor 120X (for example, a range sensor) may be provided in the continuous unloader 100C (bucket elevator 59).

<Operation Related to Monitoring of Situation Around Continuous Unloader (Bucket Elevator)>

The continuous unloader 100C is included in the work machine 100 illustrated in FIG. 1. Therefore, the control device 110 of the continuous unloader 100C transmits the three-dimensional image information from the space recognition device 40 to the management device 200. Thus, three-dimensional combined image information representing the periphery of the continuous unloader 100C is generated.

In order to generate the three-dimensional combined image information, it is necessary to recognize the position and pose of the space recognition device 40.

The control device 110 of this embodiment can communicate with the management device 200 via the communication line NW. The control device 110 transmits the three-dimensional image information captured by the space recognition device 40 to the management device 200. The management device 200 specifies the position and the pose of the space recognition device 40 based on the received three-dimensional image information and the three-dimensional marker.

In FIG. 19, the space recognition device 40 captures an image of a measurement range 1801 including a part 1811 of the external appearance of the bucket elevator 59.

The management device 200 stores a three-dimensional marker corresponding to the part 1811 of the external appearance of the bucket elevator 59 in the three-dimensional marker storage part 251.

The control device 210 of the management device 200 specifies the position and the pose of the space recognition device 40 based on the three-dimensional shape information indicating a part of the work machine 100 included in the three-dimensional image information transmitted from the control device 110 and a part of the three-dimensional marker indicating the shape of the work machine 100 stored in the three-dimensional marker storage part 251. In the case of the continuous unloader 100C, the marker detection range is different from that of the shovel 100A and that of the crawler crane 100B described above in that the marker detection range is not 0 to 0.5 m; however, the processing to be performed is the same. That is, a method of specifying the position and the pose of the space recognition device 40 based on the shape and the position of the part 1811 is the same as that of the shovel 100A and the crawler crane 100B. Therefore, the description of the method is omitted. The marker detection range of the continuous unloader 100C may be set according to the approximate distance between the space recognition device 40 and the part 1811 of the external appearance of the bucket elevator 59.

The control device 210 of the management device 200 specifies the position and the pose of the space recognition device 40, and then generates three-dimensional combined image information based on three-dimensional image information. The control device 210 may transmit the generated three-dimensional combined image information to the control device 110 of the continuous unloader 100C or may output (display) the generated three-dimensional combined image information to the output device 240.

In a case where the information is transmitted to the control device 110 of the continuous unloader 100C, image information based on the three-dimensional combined image information can be displayed on the display device 140.

The control device 110 and the management device 200 may perform known viewpoint conversion processing and composite processing on the three-dimensional combined image information to display a viewpoint converted image (overhead image) of the inside of the ship hold HD around the digging part 61 viewed from right above. Thus, the operator can more easily ascertain the state of the bulk cargo M around the digging part 61 and the positional relationship between the digging part 61 and the inner wall of the ship hold HD by referring to the overhead image of the inside of the ship hold HD viewed from right above (upper portion of the digging part 61).

In this embodiment, in the case where the continuous unloader 100C is used as the work machine 100, the measurement range 1801 including the part 1811 of the external appearance of the bucket elevator 59, which is a portion that does not deform, is set as the three-dimensional marker. This makes it easy to extract a region corresponding to the three-dimensional marker from the three-dimensional image information. A portion lower than the part 1811 of the external appearance of the bucket elevator 59 is deformed, and therefore, it is preferable not to set the portion as the three-dimensional marker. However, a portion lower than the part 1811 of the external appearance of the bucket elevator 59 may be set as a three-dimensional marker if the three-dimensional marker storage part 251 stores three-dimensional markers for every deformation pattern.

Thus, even in the case where the continuous unloader 100C is used as the work machine 100, the same effects as those of the shovel 100A and the crawler crane 100B described above can be achieved.

In the above-described embodiment, the detected information used to specify the position and pose is not limited to the three-dimensional image information. In order to specify the position and the pose, multiple types of detected information acquired from multiple types of three-dimensional detectors may be combined. The three-dimensional detector to be combined with the space recognition device 40 may include, for example, a range sensor which is an example of the peripheral monitoring sensor 120X. The control device 110 can improve the accuracy of specifying the position and shape of a part of the work machine 100 in the reference coordinate system by combining multiple types of detected information. In other words, it is possible to improve the accuracy of specifying the position and pose of the space recognition device 40 in the reference coordinate system based on the distance from the part of the work machine 100 and the like. The control device 110 may also specify the position and the pose of another three-dimensional detector in addition to the space recognition device 40. For example, the control device 110 may specify the position and the pose of the range sensor. Furthermore, the operator may adjust the position or the pose of the range sensor in accordance with the result of specification.

First Modified Example

In the above-described embodiment, an example in which the management device 200 combines three-dimensional image information has been described. However, the present disclosure is not limited to the method of combining the three-dimensional image information by the management device 200. In a first modified example, an example in which the management device 200 specifies the position and the pose of the space recognition device 40 and the work machine 100 combines the three-dimensional image information will be described.

The management device 200 of the modified example specifies the position and the pose of the space recognition device 40 provided on the work machine 100, similarly to the above-described embodiment. The management device 200 then transmits information indicating the specified position and pose to the work machine 100.

The controller 30 of the work machine 100 has the same configuration as that of the combining processing part 213 of the above-described embodiment. Thus, the controller 30 combines the three-dimensional image information captured by the space recognition device 40 based on the received position and pose to generate three-dimensional combined image information. The display control part 302 of the controller 30 outputs image information based on the three-dimensional combined image information to the output device 240. Thus, the situation around the work machine 100 is displayed.

In this modified example, the same effects as those of the above-described embodiment can be obtained, and the load on the network can be reduced by generating the three-dimensional combined image information on the work machine 100. Furthermore, since the time required for transmission and reception of information can be shortened, the time required for the display control part 302 to display image information based on the three-dimensional combined image information can also be shortened.

Second Modified Example

In the first modified example described above, an example in which the management device 200 specifies the position and the pose of the space recognition device 40 and the work machine 100 generates the three-dimensional combined image information has been described. However, the present disclosure is not limited to the method of specifying the position and the pose of the space recognition device 40 by the management device 200 as in the above-described embodiment and Modified example.

The controller 30 of the work machine 100 according to a second modified example holds the three-dimensional marker of the own device, and includes the same configuration as the specifying part 212 and the combining processing part 213.

The controller 30 specifies the position and the pose of the space recognition device 40 based on the three-dimensional image information from the space recognition device 40. The controller 30 combines the three-dimensional image information based on the specified position and pose of the space recognition device 40 to generate three-dimensional combined image information. Accordingly, in this modified example, the same effects as those of the above-described embodiment and the first modified example can be achieved.

Effect

Effects of the peripheral monitoring system SYS according to this embodiment will now be described.

In this embodiment, the peripheral monitoring system SYS specifies the position and the pose of the space recognition device 40 in the reference coordinate system based on a part of the work machine 100 detected as the three-dimensional image information (an example of the detected information) and a part of the three-dimensional marker representing the shape of the work machine 100 in the reference coordinate system. Note that, in this embodiment, an example of specifying the position and the pose is described; however, the position or the pose may be specified.

In the peripheral monitoring system SYS according to the embodiment and the modified examples described above, the example in which the specifying part 212 specifies the position and the pose using the three-dimensional marker is described. However, the examples of the above-described embodiment and modified examples are not limited to the method of using the three-dimensional marker when the position and the pose of the space recognition device 40 are specified. That is, as long as a part of the external appearance of the work machine 100 is captured in the three-dimensional image information by the space recognition device 40, the positional relationship between the work machine 100 and the space recognition device 40 can be recognized. Therefore, the specifying part 212 is only required to specify the position and the pose of the space recognition device 40 based on the three-dimensional shape information indicating the shape of the work machine 100 included in three-dimensional image information (an example of detected information) captured by the space recognition device 40.

Accordingly, the peripheral monitoring system SYS can improve recognition accuracy of the positions and the poses of the space recognition devices 40 even when the positions and the poses of the space recognition devices 40 are changed or the work machine 100 is assembled for each site. Therefore, the peripheral monitoring system SYS can more easily monitor or recognize the situation around the work machine 100 as described above. Since it is not required that the user sets the position and the pose of the space recognition device 40, a load of work on the user related to the space recognition device 40 can be reduced in the peripheral monitoring system SYS.

In this embodiment, the peripheral monitoring system SYS may generate three-dimensional combined image information by combining the three-dimensional image information of the space recognition devices 40 based on the positions and the poses of the space recognition devices 40. Accordingly, the peripheral monitoring system SYS can more easily and more accurately monitor the situation around the work machine by the operator referring to the three-dimensional combined image information according to a combine criterion (reference coordinate system).

In this embodiment, the peripheral monitoring system SYS may display image information representing the situation around the work machine 100 based on the three-dimensional combined image information. Accordingly, the peripheral monitoring system SYS can more easily provide the operator with image information representing the situation around the work machine with higher accuracy.

Furthermore, in this embodiment, two or more types of sensors may be included. Accordingly, the peripheral monitoring system SYS can more appropriately monitor the situation around the work machine by comprehensively using the information which is output of the two or more types of sensors.

In the peripheral monitoring system SYS according to this embodiment, image information three dimensionally representing the situation around the work machine 100 may be displayed while changing the viewpoint in accordance with the user's operation, based on the three-dimensional combined image information. This enables the user to more easily monitor the situation around the work machine while freely changing the viewpoint.

Although the embodiment of the work machine according to the present disclosure has been described above, the present disclosure is not limited to the above-described embodiment and the like. Various changes, modifications, substitutions, additions, deletions, and combinations may be made within the scope of the claims. Such modifications are also included in the technical scope of the present disclosure.

What is claimed is:

1. A peripheral monitoring system for a work machine, the peripheral monitoring system comprising:

- a three-dimensional detector mounted on the work machine such that a part of the work machine is included in a measurement range of the three-dimensional detector; and
- processing circuitry configured to execute a process, the process including
  - receiving an electric signal from the work machine, the electric signal including information detected by the three-dimensional detector,
  - extracting information representing at least the part of the work machine from the detected information included in the received electric signal,
  - comparing a shape of at least the part of the work machine represented by the extracted information with a shape indicated by information of the work machine prestored in a storage to calculate a degree of matching between the shape of at least the part of the work machine and the shape indicated by the prestored information of the work machine, specifying a position or a pose of the three-dimensional detector in response to determining that the degree of matching is more than or equal to a predetermined value, and transmitting an instruction to adjust the position or the pose of the three-dimensional detector to the work machine in response to determining that the degree of matching is less than the predetermined value.

2. The peripheral monitoring system as claimed in claim 1, wherein the three-dimensional detector includes a plurality of three-dimensional detectors having different measurement directions or mounting positions, the plurality of three-dimensional detectors each being mounted on the work machine such that the part included in the measurement range is different, and the processing circuitry is further configured to execute the process with respect to each of the plurality of three-dimensional detectors.

3. The peripheral monitoring system as claimed in claim 1, wherein the processing circuitry is further configured to specify the position or the pose, using a random sample consensus algorithm when performing at least one of translation, rotation, or scaling such that the shape of at least the part of the work machine represented by the extracted information matches the shape indicated by the prestored information of the work machine.

4. The peripheral monitoring system as claimed in claim 3, wherein the processing circuitry is further configured to specify the position or the pose using the random sample consensus algorithm and adjust the specified position or pose using an iterative closest point.

5. The peripheral monitoring system as claimed in claim 1, wherein the processing circuitry is further configured to perform matching between a shape representing an upper surface of the work machine among three dimensional shapes indicated by the prestored information of the work machine and the shape of at least the part of the work machine represented by the extracted information.

6. The peripheral monitoring system as claimed in claim 1, wherein the information of the work machine is information indicating a shape of the work machine obtained by the three-dimensional detector or information indicating a shape of the work machine based on three-dimensional computer-aided design data.

7. The peripheral monitoring system as claimed in claim 2, wherein the processing circuitry is further configured to combine the information detected by each of the plurality of three-dimensional detectors according to the respective specified positions of the plurality of three-dimensional detectors, and display a periphery of the work machine using the combined detected information.

8. The peripheral monitoring system as claimed in claim 1, wherein the processing circuitry is further configured to receive the electric signal including a plurality of types of the information detected by a plurality of types of the three-dimensional detectors mounted on the work machine, and specify the position or the pose of any one or more of the plurality of types of the three-dimensional detectors based on the plurality of types of the detected information.

9. The peripheral monitoring system as claimed in claim 1, wherein the three-dimensional detector is movably mounted on the work machine, and the processing circuitry is further configured to receive the electric signal including the information detected by the three-dimensional detector after the three-dimensional detector is moved.

10. The peripheral monitoring system as claimed in claim 1, wherein the part of the work machine has a shape specifiable as a shape of the work machine compared with another part of the work machine, and is immovable or undeformable.

11. The peripheral monitoring system as claimed in claim 1, wherein the processing circuitry is configured to execute the process, the process further including extracting, as the information representing at least the part of the work machine, an image region representing at least the part of the work machine from the detected image information included in the received electric signal, performing image processing on the extracted image region, and comparing the shape of at least the part of the work machine represented by the extracted image region subjected to the image processing with the shape indicated by the prestored information of the work machine to calculate the degree of matching between the shape of at least the part of the work machine and the shape indicated by the prestored information of the work machine.

12. An information processing device comprising:

processing circuitry configured to receive an electric signal from a work machine, the electric signal including information detected by a three-dimensional detector mounted on the work machine such that a part of the work machine is included in a measurement range of the three-dimensional detector, extract information representing at least the part of the work machine from the detected information included in the received electric signal, compare a shape of at least the part of the work machine represented by the extracted information with a shape indicated by information of the work machine prestored in a storage to calculate a degree of matching between the shape of at least the part of the work machine and the shape indicated by the prestored information of the work machine, specify a position or a pose of the three-dimensional detector in response to determining that the degree of matching is more than or equal to a predetermined value, and transmit an instruction to adjust the position or the pose of the three-dimensional detector to the work machine in response to determining that the degree of matching is less than the predetermined value.

13. A peripheral monitoring method for a work machine, the peripheral monitoring method comprising:

receiving an electric signal from the work machine, the electric signal including information detected by a three-dimensional detector mounted on the work machine such that a part of the work machine is included in a measurement range of the three-dimensional detector;

extracting information representing at least the part of the work machine from the detected information included in the received electric signal;

comparing a shape of at least the part of the work machine represented by the extracted information with a shape indicated by information of the work machine prestored in a storage to calculate a degree of matching between the shape of at least the part of the work machine and the shape indicated by the prestored information of the work machine;

specifying a position or a pose of the three-dimensional detector in response to determining that the degree of matching is more than or equal to a predetermined value; and transmitting an instruction to adjust the position or the pose of the three-dimensional detector to the work machine in response to determining that the degree of matching is less than the predetermined value.

* * * * *